US012718318B2

(12) United States Patent
Sun et al.

(10) Patent No.: US 12,718,318 B2
(45) Date of Patent: Aug. 25, 2026

(54) VIEW SYNTHESIS

(71) Applicant: NVIDIA Corporation, Santa Clara, CA (US)

(72) Inventors: Deqing Sun, Providence, RI (US); Orazio Gallo, Santa Cruz, CA (US); Jan Kautz, Lexington, MA (US); Jinwei Gu, San Jose, CA (US); Wei-Sheng Lai, Merced, CA (US)

(73) Assignee: NVIDIA Corporation, Santa Clara, CA (US)

( * ) Notice: Subject to any disclaimer, the term of this patent is extended or adjusted under 35 U.S.C. 154(b) by 47 days.

(21) Appl. No.: 16/299,062

(22) Filed: Mar. 11, 2019

(65) Prior Publication Data

US 2020/0294194 A1 Sep. 17, 2020

(51) Int. Cl.

*G06T 3/4038* (2024.01)
*G06N 3/08* (2023.01)
*G06V 20/10* (2022.01)

(52) U.S. Cl.

CPC ............ *G06T 3/4038* (2013.01); *G06N 3/08* (2013.01); *G06V 20/10* (2022.01); *B60R 2300/303* (2013.01)

(58) Field of Classification Search

CPC ......... G06T 2207/20084; G06T 3/4038; G06T 2207/20221; G06T 2207/30252; H04N 5/23238; B60R 2300/303

See application file for complete search history.

(56) References Cited

U.S. PATENT DOCUMENTS 6,005,987 A * 12/1999 Nakamura ............ G06T 3/4038 382/294
6,700,711 B2 * 3/2004 Nalwa .................... H04N 7/181
8,818,101 B1 * 8/2014 Lim ........................ G06T 5/006 382/277
9,129,399 B2 * 9/2015 Jin .......................... G06T 7/248

(Continued)

FOREIGN PATENT DOCUMENTS

CN 105025287 A 11/2015
CN 106412555 A 2/2017

(Continued)

OTHER PUBLICATIONS

Lai et al.; "Video Stitching for Linear Camera Arrays"; Jul. 31, 2019; arXiv.org; pp. 1-12; <https://arxiv.org/pdf/1907.13622.pdf> ( Year: 2019).*

(Continued)

*Primary Examiner* — Wesley J Tucker

(74) *Attorney, Agent, or Firm* — Davis Wright Tremaine LLP

(57) ABSTRACT

A video stitching system combines video from different cameras to form a panoramic video that, in various embodiments, is temporally stable and tolerant to strong parallax. In an embodiment, the system provides a smooth spatial interpolation that can be used to connect the input video images. In an embodiment, the system applies an interpolation layer to slices of the overlapping video sources, and the network learns a dense flow field to smoothly align the input videos with spatial interpolation. Various embodiments are applicable to areas such as virtual reality, immersive telepresence, autonomous driving, and video surveillance.

24 Claims, 12 Drawing Sheets

(56) References Cited

U.S. PATENT DOCUMENTS 9,699,378 B2 * 7/2017 Miyamoto ........... H04N 1/3876
9,723,272 B2 * 8/2017 Lu ........... B60R 1/00
10,019,654 B1 * 7/2018 Pisoni ........... G06N 3/084
10,085,011 B2 * 9/2018 Lin ........... H04N 13/246
10,210,432 B2 * 2/2019 Pisoni ........... G06K 9/6262
10,313,584 B2 * 6/2019 Pan ........... H04N 13/271
10,419,669 B2 * 9/2019 Hornung ........... H04N 5/23206
10,424,069 B2 * 9/2019 Sun ........... G06T 7/269
10,467,763 B1 * 11/2019 Sun ........... G06T 3/0093
10,511,769 B2 * 12/2019 Edpalm ........... H04N 5/23238
10,518,702 B2 * 12/2019 Al Rasheed ........... H04N 23/698
10,616,482 B2 * 4/2020 Meler ........... H04N 5/247
10,674,079 B2 * 6/2020 Pan ........... H04N 13/111
10,692,244 B2 * 6/2020 Gu ........... G06K 9/4628
10,694,105 B1 * 6/2020 Yadav ........... G06T 7/248
10,699,376 B1 * 6/2020 Kwok ........... G06T 3/4038
10,802,770 B2 * 10/2020 Fineberg ........... G06F 3/1253
10,810,847 B2 * 10/2020 Stening ........... H04N 5/23238
10,829,044 B2 * 11/2020 Tatara ........... G06K 9/00791
10,853,951 B2 * 12/2020 Abdelhak ........... G06V 10/82
10,994,665 B2 * 5/2021 Matsuba ........... B60R 1/00
11,034,305 B2 * 6/2021 Yoshida ........... G06V 20/56
11,122,238 B1 * 9/2021 van Amersfoort ........... G06N 3/09
11,341,614 B1 * 5/2022 Chen ........... B60R 1/25
11,665,430 B2 * 5/2023 Shirai ........... G06T 7/20
348/148
2007/0159524 A1 * 7/2007 Kim ........... G06T 3/4038
348/36
2010/0013930 A1 * 1/2010 Matsuo ........... B60R 1/00
348/148
2011/0150329 A1 * 6/2011 Lepine ........... G06T 3/4038
382/165
2011/0304687 A1 * 12/2011 Joshi ........... H04N 23/698
348/36
2012/0019613 A1 * 1/2012 Murray ........... H04N 13/106
348/36
2012/0229596 A1 * 9/2012 Rose ........... H04N 5/232
348/36
2013/0141526 A1 * 6/2013 Banta ........... H04N 21/21805
348/38
2014/0114534 A1 * 4/2014 Zhang ........... H04N 5/23238
701/42
2014/0220513 A1 * 8/2014 Harkness ........... G09B 9/02
434/69
2014/0254882 A1 * 9/2014 Jin ........... G06T 7/337
382/107
2014/0333757 A1 * 11/2014 Burke ........... G06T 11/60
348/113
2015/0077560 A1 * 3/2015 Zhang ........... G06K 9/00805
348/148
2016/0191795 A1 * 6/2016 Han ........... G06V 20/56
348/36
2016/0286138 A1 * 9/2016 Kim ........... H04N 1/6027
2016/0352982 A1 * 12/2016 Weaver ........... H04N 23/695
2016/0353089 A1 * 12/2016 Gallup ........... H04N 13/194
2017/0006219 A1 * 1/2017 Adsumilli ........... H04N 5/23219
2017/0127045 A1 * 5/2017 Lin ........... G06T 7/80
2017/0195560 A1 * 7/2017 Veldandi ........... G06T 7/55
2017/0244948 A1 * 8/2017 Pang ........... H04N 23/957
2017/0297488 A1 * 10/2017 Wang ........... G06T 5/006
2017/0337672 A1 11/2017 Zou et al.
2017/0341583 A1 * 11/2017 Zhang ........... B60R 1/00
2018/0007263 A1 * 1/2018 Vandrotti ........... H04N 23/698
2018/0089940 A1 * 3/2018 Petersen ........... G07F 17/3239
2018/0139431 A1 * 5/2018 Simek ........... H04N 5/2258
2018/0191954 A1 * 7/2018 Pan ........... H04N 13/246
2018/0262683 A1 * 9/2018 Meler ........... G06T 7/13
2018/0267558 A1 * 9/2018 Tiwari ........... H04N 23/90
2018/0338084 A1 * 11/2018 Edpalm ........... H04N 5/2258
2018/0373985 A1 * 12/2018 Yang ........... G06N 3/0454
2019/0005358 A1 * 1/2019 Pisoni ........... G06N 3/08
2019/0026958 A1 * 1/2019 Gausebeck ........... G06T 7/579
2019/0045168 A1 * 2/2019 Chaudhuri ........... G06T 3/4053
2019/0089940 A1 * 3/2019 Zhang ........... H04N 23/698
2019/0138786 A1 * 5/2019 Trenholm ........... G06F 18/241
2019/0164293 A1 * 5/2019 Ellison ........... G06T 7/11
2019/0202355 A1 * 7/2019 Tatara ........... B60R 1/06
2019/0302761 A1 * 10/2019 Huang ........... G05D 1/0221
2019/0325580 A1 * 10/2019 Lukac ........... G06T 3/4038
2019/0349571 A1 * 11/2019 Herman ........... H04N 23/698
2019/0392192 A1 * 12/2019 Dubey ........... G06T 7/269
2020/0013154 A1 * 1/2020 Jang ........... G06T 5/50
2020/0020075 A1 * 1/2020 Khwaja ........... G06T 5/002
2020/0045289 A1 * 2/2020 Raziel ........... G06N 3/084
2020/0084427 A1 * 3/2020 Sun ........... G06N 3/0454
2020/0090322 A1 * 3/2020 Seo ........... G06N 3/084
2020/0090359 A1 * 3/2020 Pillai ........... G06T 7/50
2020/0186710 A1 * 6/2020 Sheikh ........... H04N 23/695
2020/0202502 A1 * 6/2020 Tsymbalenko ........... G06T 5/50
2020/0202515 A1 * 6/2020 Prasad ........... G06N 3/082
2020/0265567 A1 * 8/2020 Hu ........... G06N 3/08
2020/0273185 A1 * 8/2020 Chen ........... G06T 7/33
2020/0314333 A1 * 10/2020 Liang ........... H04N 7/181
2020/0320401 A1 * 10/2020 Jampani ........... G06K 9/6272
2020/0349672 A1 * 11/2020 Cochran ........... H04N 21/2402
2020/0349769 A1 * 11/2020 Yuan ........... G06T 7/248
2020/0404243 A1 * 12/2020 Saphier ........... H04N 1/00018
2022/0207756 A1 * 6/2022 Ren ........... G06T 7/60
2023/0252653 A1 * 8/2023 Stuurman ........... G06T 7/215
382/103
2023/0421906 A1 * 12/2023 Gupta ........... G06T 3/4038

FOREIGN PATENT DOCUMENTS

CN 106791623 A 5/2017
CN 106878627 A 6/2017
CN 106934765 A 7/2017
CN 107403446 A 11/2017
CN 108616733 A 10/2018
KR 101865173 B1 6/2018

OTHER PUBLICATIONS

"CARLA: An Open Urban Driving Simulator" by Dosovitskiy et al. Proceedings of the 1st Annual Conference on Robot Learning, PMLR 78:1-16, 2017 (Year: 2017).*
Lee et al., "Improved method on image stitching based on optical flow algorithm", International Journal of Engineering Business Management, vol. 12 https://doi.org/10.1177/1847979020980928 (Year: 2020).*
Anderson et al., "Jump: Virtual Reality Video," ACM Transactions on Graphics, 35(6):1-13, Nov. 2016.
Article 67(3) EPC Communication mailed Aug. 19, 2020, European Patent Application No. 20162125.7, 2 pages.
Communication Pursuant to Rule 69 EPC, mailed Sep. 21, 2020, European Patent Application No. 20162125.7, 2 pages.
Extended European Search Report mailed Jul. 29, 2020, European Patent Application No. 20162125.7, 12 pages.
IEEE Computer Society, "IEEE Standard 754-2008 (Revision of IEEE Standard 754-1985): IEEE Standard for Floating-Point Arithmetic," The Institute of Electrical and Electronics Engineers, Inc., Aug. 29, 2008, 70 pages.
Jin et al., "Learning to Dodge A Bullet: Concyclic View Morphing via Deep Learning," European Conference on Computer Vision, Sep. 8, 2018, 18 pages.
Kang et al., "Seamless Stitching using Multi-Perspective Plane Sweep," Microsoft Technical Report MSR-TR-2004-48, Jun. 2004, retreived Nov. 5, 2020, from https://www.microsoft.com/en-us/research/wp-content/uploads/2016/02/tr-2004-48.pdf, 15 pages.
Peleg et al., "Omnistereo: Panoramic Stereo Imaging," IEEE Transactions on Pattern Analysis and Machine Intelligence, 23(3):279-290, Mar. 2001.
Richardt et al., "Megastereo: Constructing High-Resolution Stereo Panoramas," 2013 IEEE Conference on Computer Vision and Pattern Recognition, Jun. 23, 2013, 8 pages.
Tan et al., "Stable stitching method for stereoscopic panoramic video," CAAI Transactions on Intelligence Technology, 3(1):1-7, Mar. 2018.

(56) References Cited

OTHER PUBLICATIONS

Baker et al., "A Database and Evaluation Methodology for Optical Flow," International Journal Computer Vision, 2011, 31 pages.
Barron et al., "Performance of Optical Flow Techniques," IJCV, 12(1): 1994, 35 pages.
Brox et al., "Large Displacement Optical Flow: Descriptor Matching in Variational Motion Estimation," PAMI, 33(3): 2011, 14 pages.
Butler et al., "A Naturalistic Open Source Movie for Optical Flow Evaluation," ECCV, 2012, 15 pages.
Creswell et al., "Generative Adversarial Networks: An Overview," Oct. 19, 2017, 14 pages.
Dosovitskiy et al., "CARLA: An Open Urban Driving Simulator," Nov. 10, 2017, 16 pages.
Dosovitskiy et al., "FlowNet: Learning Optical Flow with Convolutional Networks," ICCV, 2015, 9 pages.
Dosovitskiy et al., "Learning to Generate Chairs, Tables and Cars with Convolutional Networks," IEEE Transactions on Pattern Analysis and Machine Intelligence, Aug. 2, 2017, 14 pages.
Geiger et al., "Are we Ready for Autonomous Driving? The KITTI Vision Benchmark Suite," CVPR, 2012, 8 pages.
Goodfellow, "NIPS 2016 Tutorial: Generative Adversarial Networks," Apr. 3, 2017, 57 pages.
Herbst et al., "Occlusion Reasoning for Temporal Interpolation using Optical Flow," Technical Report, Aug. 2009, 41 pages.
Horn et al., "Determining Optical Flow," Artificial Intelligence, 1981, 19 pages.
Huang et al., "An Introduction to Image Synthesis with Generative Adversarial Nets," Nov. 17, 2018, 17 pages.
Ilg, E., et al., "FlowNet 2.0: Evolution of Optical Flow Estimation with Deep Networks," IEEE Conference on Computer Vision and Pattern Recognition, 2017, 9 pages.
Jiang et al., "Super SloMo: High Quality Estimation of Multiple Intermediate Frames for Video Interpolation," Jul. 13, 2018, 9 pages.
Li et al., "Learning for Optical Flow using Stochastic Optimization," ECCV, 2008, 13 pages.
Liang et al., "Dual Motion GAN for Future-Flow Embedded Video Prediction," Advances in Neural Information Processing Systems, 2017, 9 pages.
Liu et al., "Video Frame Synthesis using Deep Voxel Flow," IEEE International Conference on Computer Vision, Aug. 5, 2017, 9 pages.
Long et al., "Learning Image Matching by Simply Watching Video," ECCV, Mar. 29, 2016, 21 pages.
Mahajan et al., "Moving Gradients: A Path-Based Method for Plausible Image Interpolation," ACM Transactions on Graphics, vol. 28, 2009, 10 pages.
Meyer et al., "Phase-Based Frame Interpolation for Video," CVPR, 2015, 9 pages.
Niklaus et al., "Video Frame Interpolation via Adaptive Convolution," CVPR, 2017, 10 pages.
Niklaus et al., "Video Frame Interpolation via Adaptive Separable Convolution," ICCV, 2017, 10 pages.
Office Action for European Application No. 20162125.7, mailed Feb. 8, 2023, 6 pages.
Patraucean et al., "Spatio-temporal Video Autoencoder with Differentiable Memory," 2016, 13 pages.
Ranjan et al., "Optical Flow Estimation using a Spatial Pyramid Network," CVPR, 2017, 10 pages.
Revaud et al., "EpicFlow: Edge-Preserving Interpolation of Correspondences for Optical Flow," CVPR, 2015, 9 pages.
Roth et al., "On The Spatial Statistics of Optical Flow," IJCV, 74(1): 2007, 30 pages.
Sun et al., "Learning Optical Flow," ECCV, 2018, 15 pages.
Sun et al., "PWC-Net: CNNs for Optical Flow Using Pyramid, Warping, and Cost Volume," CVPR, 2018, 10 pages.
Szeliski et al., "Prediction Error as a Quality Metric for Motion and Stereo," ICCV, 1999, 8 pages.
Wang et al., "Light Field Video Capture using a Learning-Based Hybrid Imaging System," ACM TOG, 36(4): 2017, 13 pages.
Wulff et al., "Optical Flow in Mostly Rigid Scenes," 2017 IEEE Conference on Computer Vision and Pattern Recognition, 2017, pp. 6911-6920.
Xu et al., "Accurate Optical Flow via Direct Cost Volume Processing," CVPR, 2017, 9 pages.
Yu et al., "Back to Basics: Unsupervised Learning of Optical Flow via Brightness Constancy and Motion Smoothness," ECCV, 2016, 4 pages.
Office Action for European Application No. 20162125.7, mailed Mar. 26, 2025, 6 pages.
Zhou et al., "View Synthesis by Appearance Flow," Sep. 2016, 16 pages.
Office Action for Chinese Application No. 202010166505.0, mailed Jul. 30, 2024, 25 pages.
Peleg et al., "Omnistereo: Panoramic Stereo Imaging," IEEE Transactions on Pattern Analysis and Machine Intelligence, 23(3): Mar. 2001, 12 pages.
Wang et al., "Matching Technologies of UAV Remote Sensing Image Based on SIFT," Journal of Jilin University, 35(2): Mar. 2017, 10 pages.
Office Action for Chinese Application No. 202010166505.0, mailed Apr. 29, 2025, 21 pages.
Office Action for Chinese Application No. 202010166505.0, mailed Aug. 1, 2025, 24 pages.
Decision of Rejection for Chinese Application No. 202010166505.0, mailed Jan. 30, 2026, 23 pages.

* cited by examiner

VIEW SYNTHESIS

BACKGROUND

Video and image data is used in a variety of applications from video streaming, automated driving, and virtual reality. With many vision-based systems, visual data from multiple views needs to be collected. For example, an automated car may have cameras on the front of the car, the sides of the car, and out the back of the car to provide a 360 degree visual view. However assembling a 360 degree view from multiple cameras can cause problem, particularly if the cameras are not located in the same position. In many systems, an unavoidable separation between cameras creates a parallax error when trying to combine the images. Nonetheless, a number of algorithms have been devised to stitch images together to form a single wider image. When applied to video, however, these techniques create artifacts and errors that, while not noticeable in a still frame, are particularly glaring when present in video. Therefore, video stitching is a particularly difficult problem, especially when the video to be combined is sourced from cameras at different locations.

BRIEF DESCRIPTION OF THE DRAWINGS

Various techniques will be described with reference to the drawings, in which.

DETAILED DESCRIPTION

Figure 1:
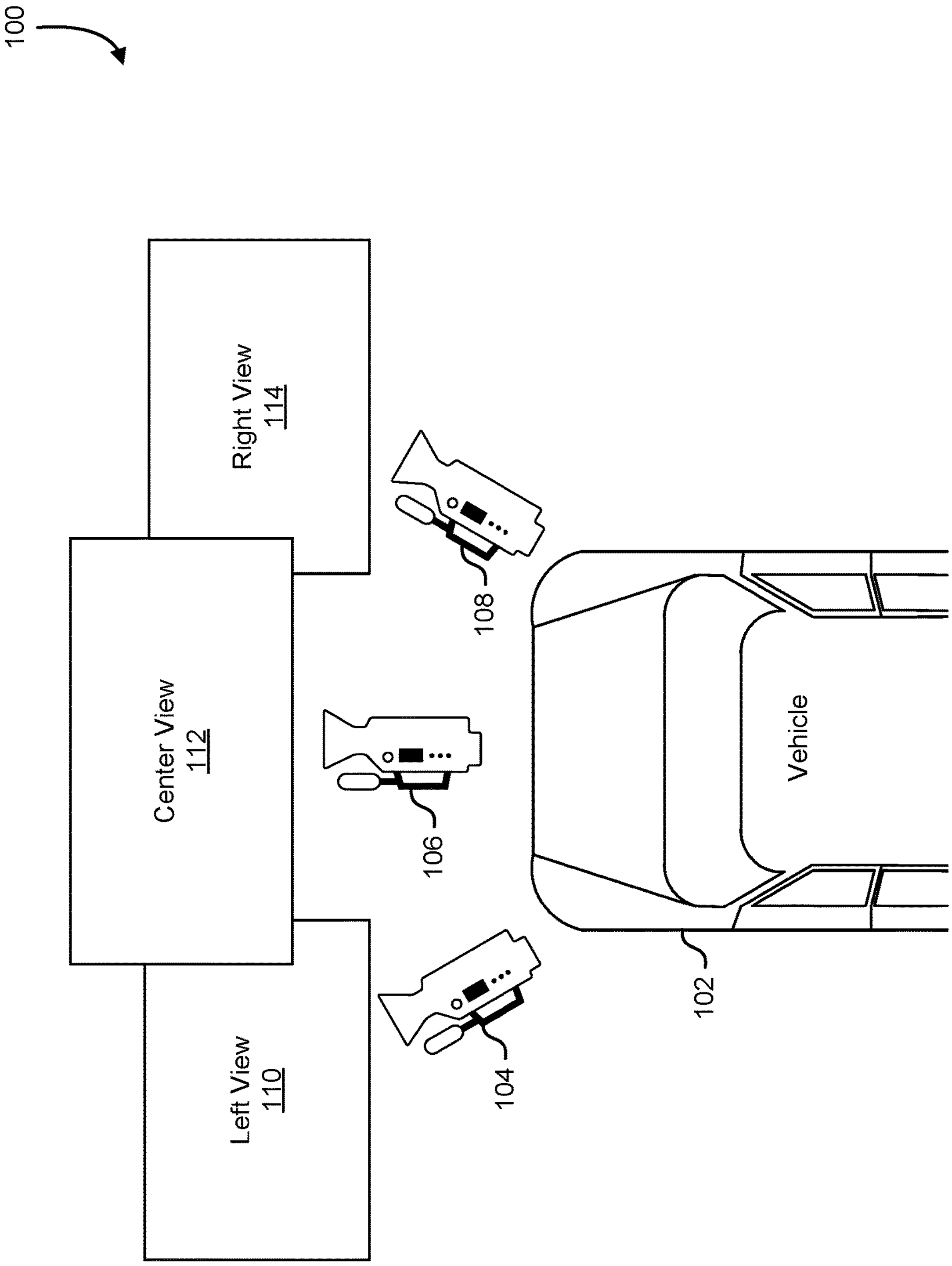
FIG. 1 illustrates an example of a vehicle with three cameras positioned at different locations on the vehicle that, when combined, provide a panoramic view, in an embodiment.

The present document describes a system that combines a plurality of overlapping video images collected from a plurality of cameras into a panoramic video. In an embodiment, the system joins overlapping videos by generating a transitional video for the overlapping region, and the transitional video is used to join the non-overlapping regions of the source videos. In an embodiment, the transitional video is generated by performing a cylindrical projection on the source videos, processing the source videos with a flow estimation network, producing the transitional video using a slice-wise interpolation, and then refining the resulting transitional video. In various examples, the resulting panoramic video produces a smooth spatial interpolation that is both temporally stable and tolerant to strong parallax.

In an embodiment, video is obtained from a plurality of cameras positioned at different locations. In an embodiment, the cameras have overlapping fields of view so that each camera has non-overlapping region and an overlapping region covered by another camera. In an embodiment, the cameras may be positioned at different locations resulting in a parallax error for objects positioned closer to the cameras. For example, cameras positioned on the right and left sides of the vehicle with exhibit a parallax error with respect to a front facing camera positioned on the center of the vehicle. In an embodiment, in order to minimize the appearance of change between the three views, the system applies opposed transformation that warps the origin of the video generated by the left and right cameras to match that of the center camera. In an embodiment, a cylindrical projection is applied that warps the center, left, and right views onto a common viewing cylinder. In an embodiment, additional corrections may be performed that adjust for camera calibration, exposure compensation, fisheye distortion correction, and cylindrical projection.

In an embodiment, the overlapping portions of the adjusted video are identified as transition regions for which a transitional video is created. In an embodiment, the transitional video is generated through the process of interpolation. In an embodiment, the system identifies a plurality of vertical slices from both images in the overlapping region which are used to create a smooth transition from one camera view to another camera view. In an embodiment, outside the transition region, the non-overlapping portions of the source videos are used without modification. In an embodiment, the video within the transition region gradually changes from one point of view to another by taking corresponding columns from the source video. In an embodiment, is finer interpolation steps (slices) are taken, higher-quality stitched results are produced. In an embodiment, performance is improved by providing a network that implements a fast pushbroom interpolation layer.

In an embodiment, the image is further refined using an image refinement network. In an embodiment, the network is trained using realistic synthetic data produced by an urban driving simulator. In an embodiment, the simulator allows the positioning of cameras at intermediate locations, and ground truth is produced using the views captured from the intermediate cameras of the simulator.

Various embodiments are particularly well-suited to applications where, due to sensor resolution and optics limitations, the field of view provided by a single camera is too narrow, and physical limitations require multiple cameras to be positioned apart from one another causing parallax. For example, various embodiments are particularly well-suited to autonomous driving applications or multiple cameras are positioned on various locations of a vehicle and stitched into a single panoramic view. In another example, various embodiments are well suited to virtual-reality, telepresence, and video surveillance applications.

As one skilled in the art will appreciate in light of this disclosure, certain examples may be capable of achieving certain advantages, including some or all of the following: (1) elimination of artifacts caused by seam-based approaches, (2) tolerance to strong parallax caused by camera separation, (3) temporal stability of the image, and (4) reduction in ghosting and broken objects.

FIG. 1 illustrates an example of a vehicle with three cameras positioned at different locations on the vehicle that, when combined, provide a panoramic view, in an embodiment. In an embodiment, FIG. 1 depicts an example 100 of a vehicle 102 utilizing camera 104 to provide a left view 110, camera 106 to provide a center view 112, and camera 108 to provide a right view 114. In an embodiment, the vehicle 102 can be any suitable machine utilized for transportation, such as a motor vehicle, railed vehicle, watercraft, amphibious vehicle, aircraft, spacecraft, and/or variations thereof. Additionally, in an embodiment, the vehicle 102 can be an operable vehicle, an autonomous vehicle, and/or variations thereof.

In an embodiment, the cameras 104, 106, and 108 can be image capture devices for electronic motion picture acquisition and/or electronic still picture acquisition. In an embodiment, the cameras 104, 106, and 108 can include an image sensor, memory, image processing capability, microphone and/or various other components. In an embodiment, the cameras 104, 106, and 108 can be designed to record and/or communicate a digital or analog stream of media (e.g., audio, video, text, or any combination of audio, video, or text) in a manner such that the media can be replayed or reproduced on a device designed to display such media. In an embodiment, examples of such image capture devices can include a digital video camera, a web camera, mobile telephone, and so on. In an embodiment, the cameras 104, 106, and 108 generate a view of the environment that comprises the example 100; in an embodiment, the view of the environment comprises the left view 110, center view 112, and tight view 114.

In an embodiment, the left view 110, center view 112, and tight view 114 are image and/or video views from the perspective of the vehicle 102. Additionally, in an embodiment, the left view 110, center view 112, and right view 114 can be real-time live video from the cameras 104-108, pre-recorded video from the cameras 104-108, and/or variations thereof. In an embodiment, the left view 110, center view 112, and right view 114 can be transformed to onto a common viewing cylinder, such as the viewing cylinder described in connection with FIG. 3. In an embodiment, the left view 110 and right view 114 can be utilized in a camera pose transformation to warp the origin points of the left view 110 and right view 114 to be set at the camera 106. In an embodiment, a cylindrical projection can then be utilized to warp the left view 110, center view 112, and right view 114 onto a common viewing cylinder. In an embodiment, the transitions between each view can be generated and refined through a system such as the video stitching system 202 described in connection with FIG. 2.

In an embodiment, the system may be used to generate a telepresence display where two or more cameras are used to collect images the conference room or other space. In an embodiment, the images are stitched together into a single panoramic image and transmitted over computer network to a receiving computer system. The receiving computer system, in an embodiment, displease the panoramic image on wide format display so that one or more individuals at the receiving computer system can view the environment of the conference room or other space.

Figure 2:
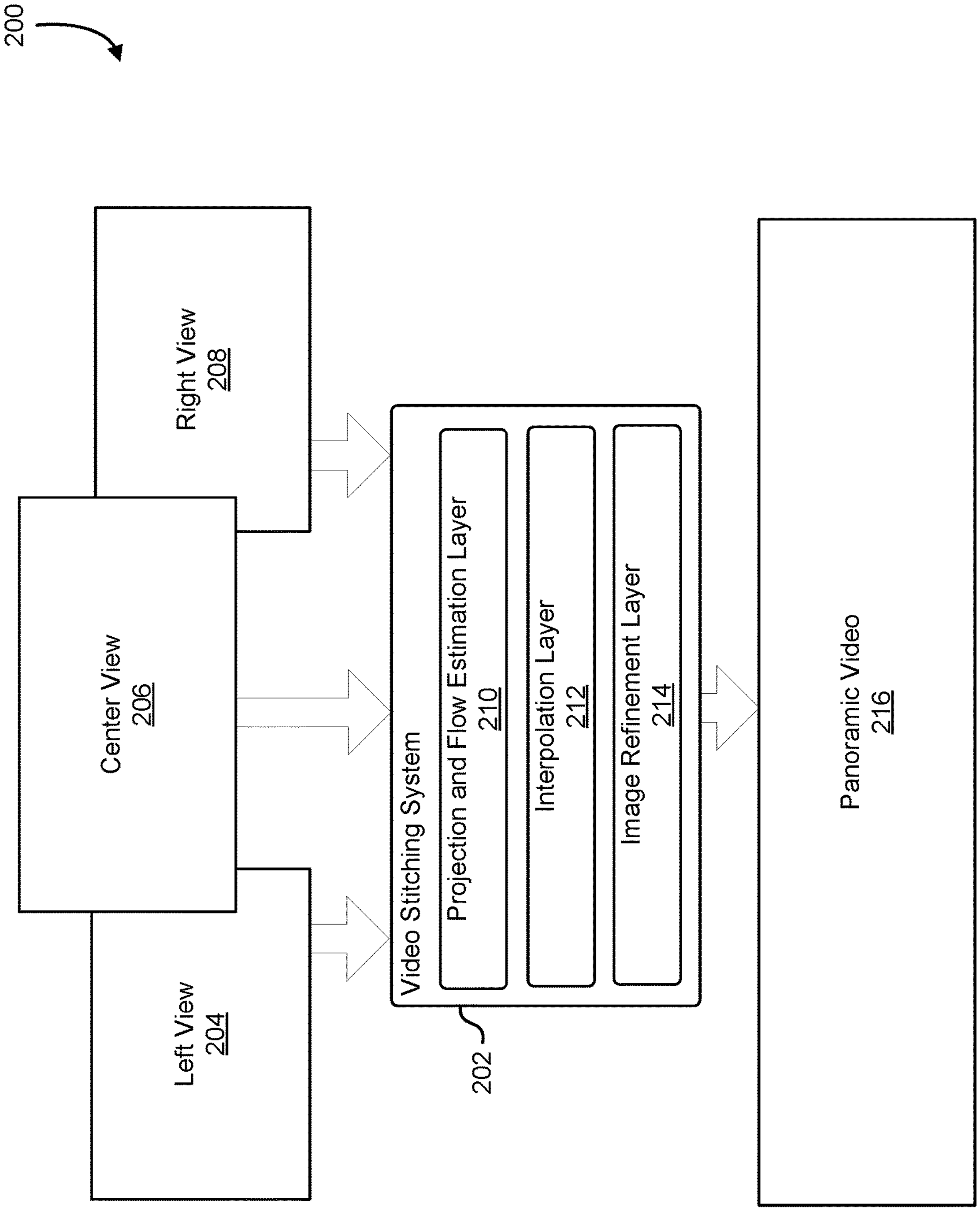
FIG. 2 illustrates an example of a computer system that combines output from three image sources to produce a panoramic image, in an embodiment.

FIG. 2 illustrates an example of a computer system that combines output from three image sources to produce a panoramic image, in an embodiment. In an embodiment, FIG. 2 depicts an example 200 of a video stitching system 202, comprising a projection and flow estimation layer 210, an interpolation layer 212, and an image refinement layer 214, which generates a panoramic video 216 from a left view 204, a center view 206, and a right view 208. In an embodiment, the projection and flow estimation layer 210, interpolation layer 212, and image refinement layer 214 can utilize various applications and/or programs executing on the video stitching system 202, or retrieved from an external source. In an embodiment, the video stitching system 202 can be any suitable system, such as a computer system and/or graphics system. In an embodiment, a computer system can comprise one or more instances of a physical computing instance, such as a physical computer or device, or one or more instances of a virtual computing instance, such as a virtual machine, which can be hosted on one or more computer servers. Additionally, in an embodiment, a computer system can comprise various components and/or subsystems, such as one or more processors, memory storing instructions executable by the one or more processors, graphics subsystems, and/or variations thereof.

In an embodiment, a graphics system is a system that can exist on a computer system and/or other system to provide processing capabilities, specifically the processing of graphics through the usage of a graphics processing unit, although other processes can be performed by the graphics system. In an embodiment, a graphics system can comprise one or more variations of discrete and/or integrated graphics systems. In an embodiment, an integrated graphics system is a graphics system comprising memory shared with a processing unit of another system to perform and execute various processes. A discrete graphics system, in an embodiment, is a graphics system comprising memory separate from memory utilized by processing units of other systems. In an embodiment, a discrete graphics systems utilizes an independent source of video memory and/or other memory types to perform and execute processes. In an embodiment, the system can be a parallel processing unit ("PPU") or a general processing cluster ("GPC").

In an embodiment, the video stitching system 202 utilizes the left view 204, center view 206, and right view 208 as inputs. In an embodiment, the video stitching system 202 can retrieve the left view 204, center view 206, and right view 208 through the usage of one or more networks and interfaces, such as the Internet, through various external/internal data storage systems, and/or variations thereof. In an embodiment, the left view 204, center view 206, and right view 208 are the outputs from image sources originating from various image capturing devices, such as the camera 104, camera 106, and camera 108 described in connection with FIG. 1. In an embodiment, the left view 204, center view 206, and right view 208 are the same views as the left view 110, center view 112, and right view 114 of FIG. 1, respectively. In an embodiment, the left view 204, center view 206, and right view 208 can correspond to various views from the perspective of a vehicle, such as a car. Additionally, in an embodiment, the left view 204, center view 206, and right view 208 can be videos from real-time live videos of the views, pre-recorded videos of the views, and/or variations thereof. In an embodiment, a video can comprise a stream of a sequence of frames, as well as accompanying audio.

In an embodiment, the video stitching system 202 transforms and warps the left view 204, center view 206, and right view 208 in the projection and flow estimation layer 210. In an embodiment, the projection and flow estimation layer 210 is a collection of computing resources, physical and/or virtual, configured to provide various operations for the input views, including various transforming operations, the generation of flow fields, and/or variations thereof. In an embodiment, a flow field refers to a field that denotes the change, or flow, between one image frame and another. In an embodiment, for example, one image frame can comprise a depiction of an object. In an embodiment, another image frame can comprise a depiction of the same object translated to the left. In an embodiment, a flow field between the two image frames can comprise vectors and/or other indications that denote the change of position of the object to the left between the two image frames.

Figure 3:
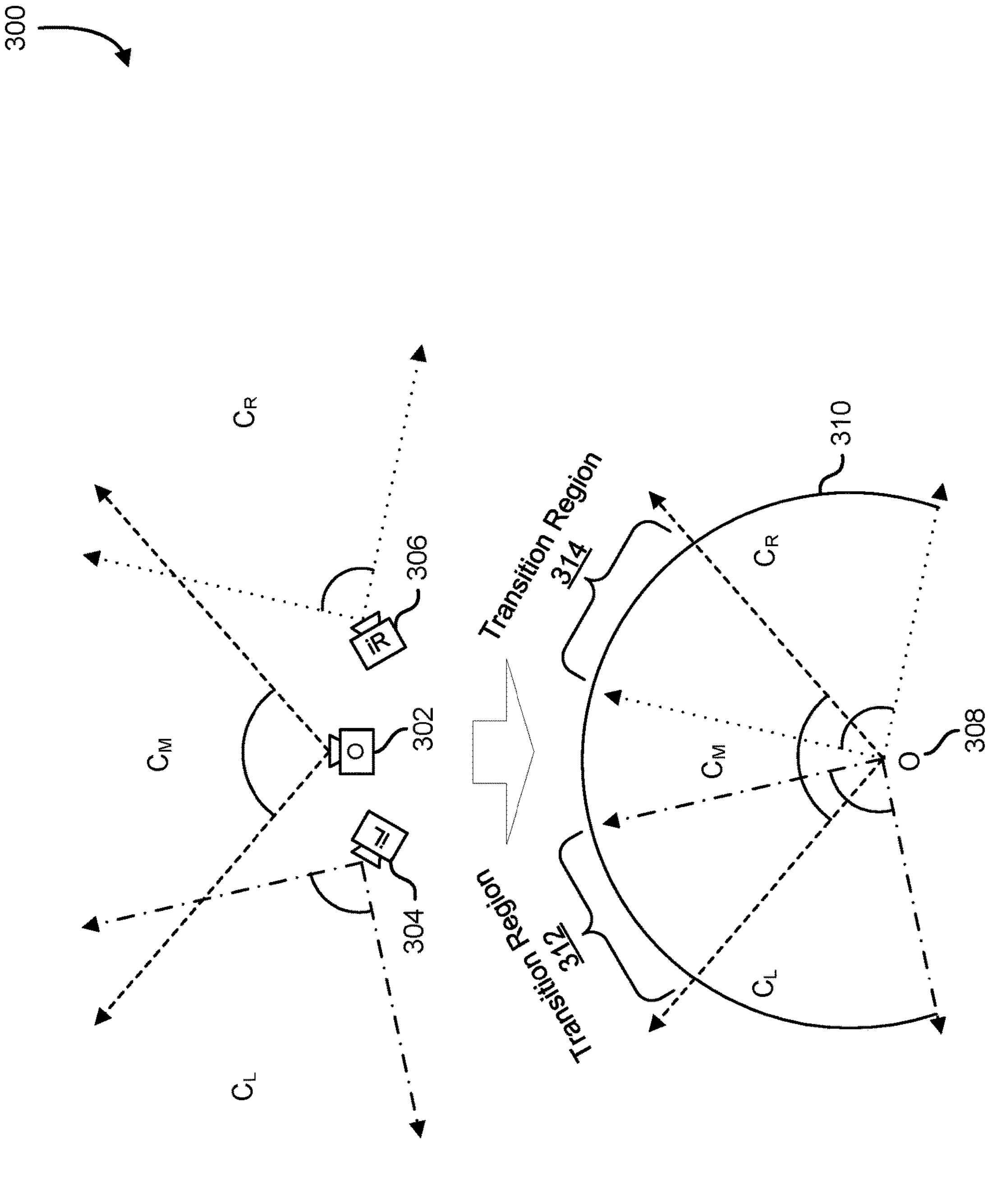
FIG. 3 illustrates an example of three image sources that are aligned on a viewing cylinder at a shared position, in an embodiment.

In an embodiment, the projection and flow estimation layer 210 transforms the views of the left view 204, center view 206, and right view 208 onto a common viewing cylinder, such as the viewing cylinder described in connection with FIG. 3. In an embodiment, the projection and flow estimation layer 210 can utilize a transformation, such as a camera pose transformation, projective transformation, and/or variations thereof, to warp the origin points of the left view 204 and right view 208 to be set at the origin point of the center view 206. In an embodiment, the projection and flow estimation layer 210 can then utilize a cylindrical projection to warp the left view 204, center view 206, and right view 208 onto a common viewing cylinder producing a cylindrical view, or perspective, comprising the left view 204, center view 206, and right view 208. In an embodiment, the cylindrical view can comprise various regions of overlap, denoted as transition regions, between the views; in an embodiment, for example, a transition region can exist between the left view 204 and center view 206, and between the center view 206 and right view 208. In an embodiment, the projection and flow estimation layer 210 generates flow fields for each frame of each transition region. In an embodiment, a transitional video can be generated through the interpolation layer 212 for each transition region.

In an embodiment, the interpolation layer 212 is a collection of computing resources, physical and/or virtual, configured to interpolate between the left view 204, center view 206, and right view 208 to generate various transitional videos between the views to produce a unified, continuous panoramic video 216. In an embodiment, the interpolation layer 212 can be denoted as the pushbroom interpolation layer. In an embodiment, the projection and flow estimation layer 210 produces a cylindrical view comprising the left view 204, center view 206, and right view 208. In an embodiment, the cylindrical view can comprise transition regions that correspond to two overlapping views, in which a view overlaps with another view (e.g., the left view 204 transitions into, resulting in an overlap with, the center view 206). In an embodiment, due to the various transformations performed on the views to generate the cylindrical view, these transition regions can comprise various alignment, ghosting, and occlusion distortions. In an embodiment, these distortions can be removed and/or refined through the generation of transitional videos via the interpolation layer 212 that can utilized in place of the transition regions.

In an embodiment, the interpolation layer 212 produces a transitional video for a transition region between two views by interpolating between the two views. Furthermore, in an embodiment, the interpolation layer 212 produces two transitional videos, one transitional video for the transition region between the left view 204 and center view 206, and another transitional video for the transition region between the center view 206 and right view 208. In an embodiment, the interpolation layer 212 operates specifically on transition regions as discussed in the preceding paragraphs.

In an embodiment, the interpolation layer 212 separates a frame of a transition region, which corresponds to two frames from two views, into slices; in an embodiment, the number of slices can vary based on various criteria, such as desired quality, performance, and/or variations thereof. In an embodiment, each slice of the frame of the transition region corresponds to two overlapping slices, one from each of the corresponding frames of each view that the frame of the transition region corresponds to. In an embodiment, for each slice of the frame of the transition region, the interpolation layer 212 interpolates between the two slices the slice corresponds to, to generate a plurality of interpolated slices. In an embodiment, the interpolation layer 212 utilizes flow fields generated for the frame of the transition region to assist in the interpolation between slices. In an embodiment, the interpolated slices are concatenated together to generate a complete interpolated frame, which can be referred to as a complete interpolated view. In an embodiment, each frame of the transition region can be processed by the interpolation layer 212 and joined to form a transitional video. In an embodiment, transitional videos are formed for each transition region; in an embodiment, the transitional videos can be utilized in place of each transition region. Further information regarding the processes of the interpolation layer 212 can be found in the descriptions of FIG. 4, FIG. 5, and FIG. 6.

In an embodiment, the image refinement layer 214 is a collection of computing resources, physical and/or virtual, configured to refine the transitional videos generated as a result of the processes of the interpolation layer 212. In an embodiment, the image refinement layer 214 is an encoder-decoder network comprising various convolutional layers; in an embodiment, the image refinement layer 214 can utilize processes such as a skip connection process to incorporate details from the un-processed left view 204, center view 206, and right view 208 into the final panoramic video 216 generated from the left view 204, center view 206, and right view 208. In an embodiment, the image refinement layer 214 refines the transitional videos generated in the interpolation layer 212. Additionally, in an embodiment, the image refinement layer 214 can be trained to perform the refinement in a more efficient manner. In an embodiment, the image refinement layer 214 is trained using realistic synthetic data produced by an urban driving simulator. In an embodiment, the urban driving simulator can simulate various configurations of image sources to produce various left views, center views, and right views. In an embodiment, the urban driving simulator can simulate various ground truth panoramic videos for the various configurations of left views, center views, and right views. In an embodiment, training data can be formed utilizing various configurations of left views, center views, right views, and the corresponding ground truth panoramic videos formed for the various configurations, to train the image refinement layer 214.

In an embodiment, the transitional videos produced from the transition regions of the cylindrical view produced from the left view 204, center view 206, and right view 208, along with the remaining regions (i.e., the regions outside the transition regions) of the cylindrical view, are concatenated to produce the panoramic video 216. It should be noted that, in various embodiments, any number of views can be utilized by the video stitching system 202 to produce any number of transitional videos to result in a unified panoramic video, FIG. 3 illustrates an example of three image sources that are aligned on a viewing cylinder at a shared position, in an embodiment. In an embodiment, FIG. 3 depicts an example 300 of the alignment of three image sources, namely a camera 304, camera 302, and camera 306. In an embodiment, the camera 304, camera 302, and camera 306 are the same or different as the camera 104, camera 106, and camera 108, respectively, described in connection with FIG. 1. In an embodiment, the camera 304, camera 302, and camera 306 can be image capture devices for electronic motion picture acquisition and/or electronic still picture acquisition. In an embodiment, examples of such image capture devices include a digital video camera, a web camera, mobile telephone, and so on.

In an embodiment, the views from the camera 304, camera 302, and camera 306 can be aligned on a viewing cylinder at a shared position 308. In an embodiment, the camera 304, camera 302, and camera 306 can be aligned by a system, such as the video stitching system 202 described in connection with FIG. 2. In an embodiment, a transformation, such as a camera pose transformation, projective transformation, and/or variations thereof, can be utilized to warp the origin points of the view from the camera 304 and the view from the camera 306 to be set at the origin point of the view from the camera 302. In an embodiment, a cylindrical projection can then be utilized to warp the views from the camera 304, camera 302, and camera 306 onto a common viewing cylinder producing a cylindrical view 310, or perspective. In an embodiment, various other operations, such as camera calibration, exposure compensation, fisheye distortion correction, cylindrical projection, and/or variations thereof, can be utilized to produce the cylindrical view 310.

In an embodiment, the cylindrical view 310 can comprise various regions of overlap, or transition regions, between the views; in an embodiment, the transition region 312 can correspond to the overlap between the warped views from camera 304 and camera 302, and the transition region 314 can correspond to the overlap between the warped views from camera 302 and camera 306. In an embodiment, the transition regions can comprise various alignment, ghosting, and occlusion distortions due to the overlapping of the warped views. In an embodiment, transitional videos can be generated for each transition region to mitigate the potential distortions.

Figure 4:
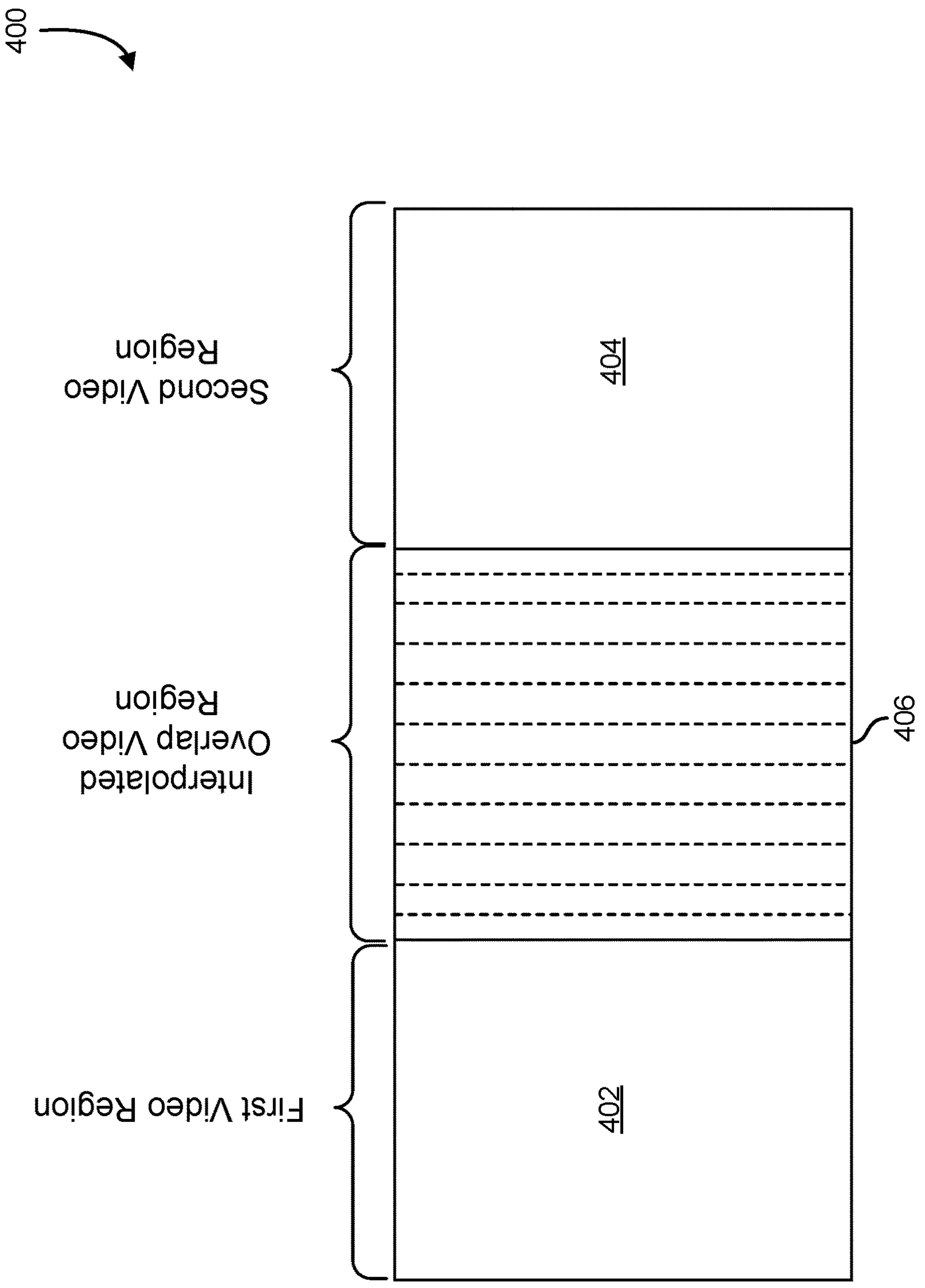
FIG. 4 illustrates an example of a panoramic video created by joining a first and second video with an interpolated overlapping region, in an embodiment.

FIG. 4 illustrates an example of a panoramic video created by joining a first and second video with an interpolated overlapping region, in an embodiment. In an embodiment, FIG. 4 depicts an example 400 of a panoramic video comprising a first video region 402, an interpolated overlap video region 406, and a second video region 404. In an embodiment, the first video region 402 can be a region of a first video, and the second video region 404 can be a region of a second video; in an embodiment, the first and second videos can be videos recorded from the perspective of a vehicle, such as the vehicle 102 described in connection with FIG. 1. In an embodiment, the first video and second video can be videos that have been transformed and aligned onto a common viewing cylinder.

In an embodiment, the first video is joined with the second video utilizing a common viewing cylinder, forming a cylindrical view. In an embodiment, the cylindrical view formed from the first video and second video comprises a region of overlap, or a transition region, in which a portion of the first video overlaps with a portion of the second video. In an embodiment, the transition region can comprise various alignment, ghosting, and occlusion distortions. In an embodiment, these distortions can be mitigated and/or resolved through the generation of the interpolated overlap video region 406 to be utilized in place of the transition region.

In an embodiment, the first video and second video can be stitched together by the usage of a system, such as the video stitching system 202 described in connection with FIG. 2. In an embodiment, the interpolated overlap video region 406 can be generated through various interpolation processes that interpolate between the overlapping region of the first video and overlapping region of the second video. In an embodiment, the transition region between the first video region 402 and second video region 404 can be divided into slices. In an embodiment, each slice of the transition region corresponds to a slice from the overlapping region of the first video and a slice from the overlapping region of the second video. In an embodiment, an interpolation between slices of the overlapping region of the first video and slices of the overlapping region of the second video is utilized to generate the slices of the interpolated overlap video region 406. Further information regarding the processes of interpolation can be found in the description of FIG. 6.

Figure 5:
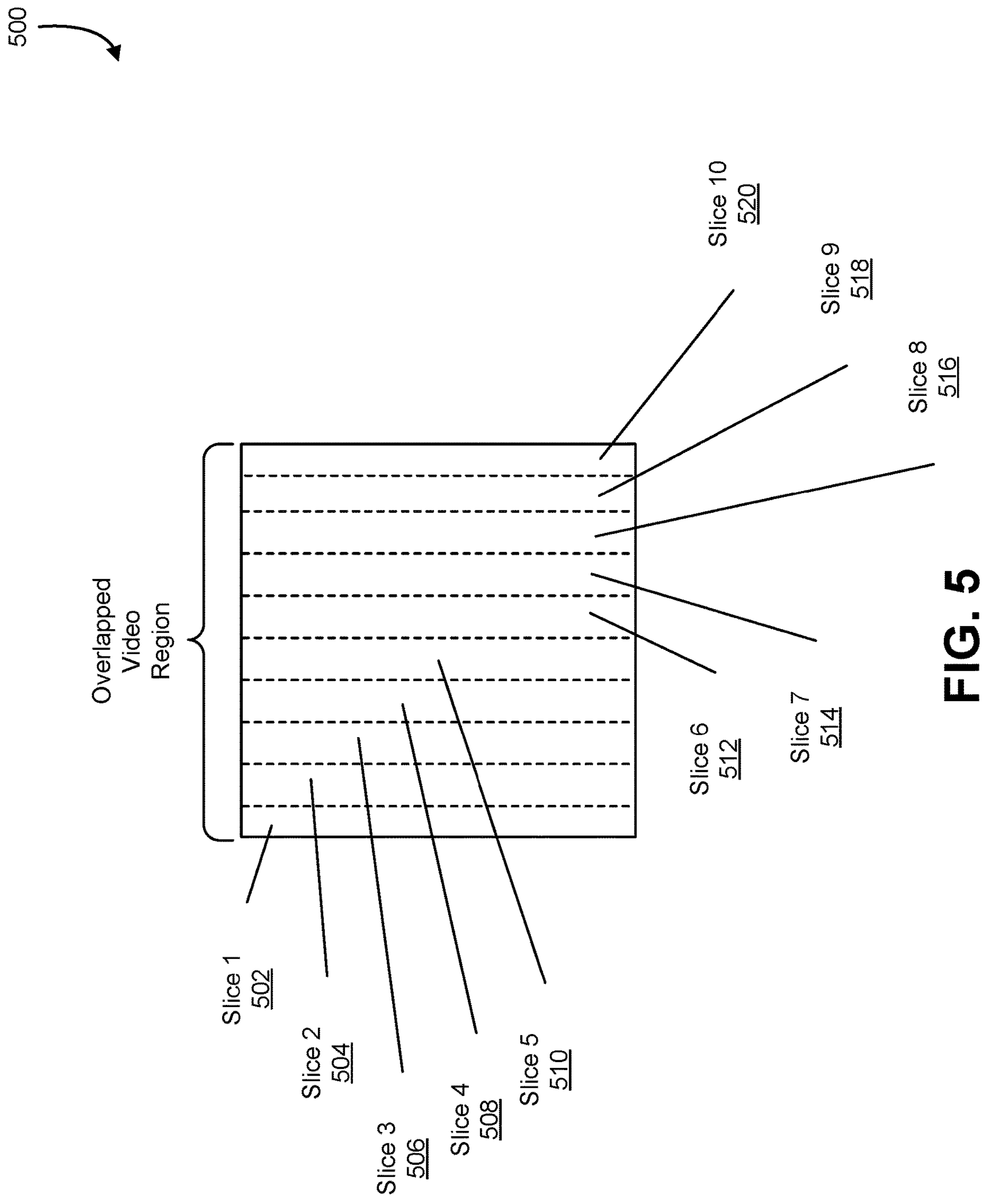
FIG. 5 illustrates an example of a plurality of slices of an overlapped video region, in an embodiment.

FIG. 5 illustrates an example of a plurality of slices of an overlapped video region, in an embodiment. In an embodiment, FIG. 5 depicts an example 500 of an overlapped video region comprising slices 502-520. In an embodiment, the overlapped video region is the result of stitching two video regions together. In an embodiment, two video regions can be stitched together by warping and transforming the two video regions onto a common viewing cylinder, forming a cylindrical view. In an embodiment, the cylindrical view formed from the two video regions comprises a transition region in which a region of the two video regions overlap with each other. In an embodiment, the transition region can comprise various alignment, ghosting, and occlusion distortions. In an embodiment, these distortions can be mitigated and/or resolved through the generation of interpolated slices to form an interpolated overlap video region.

In an embodiment, the overlapped video region is divided into slices comprising slices 502-520. In an embodiment, each of the slices 502-520 corresponds to two different slices, one from each of the overlapping regions of the two video regions. In an embodiment, each pair of slices for each of the slices 502-520 can be interpolated between each other to generate a plurality of interpolated slices; in an embodiment, the interpolated slices can be utilized to form a transition video (i.e., interpolated overlap video region) that can be utilized in place of the overlapped video region. Further information regarding the processes of interpolation can be found in the description of FIG. 6.

Figure 6:
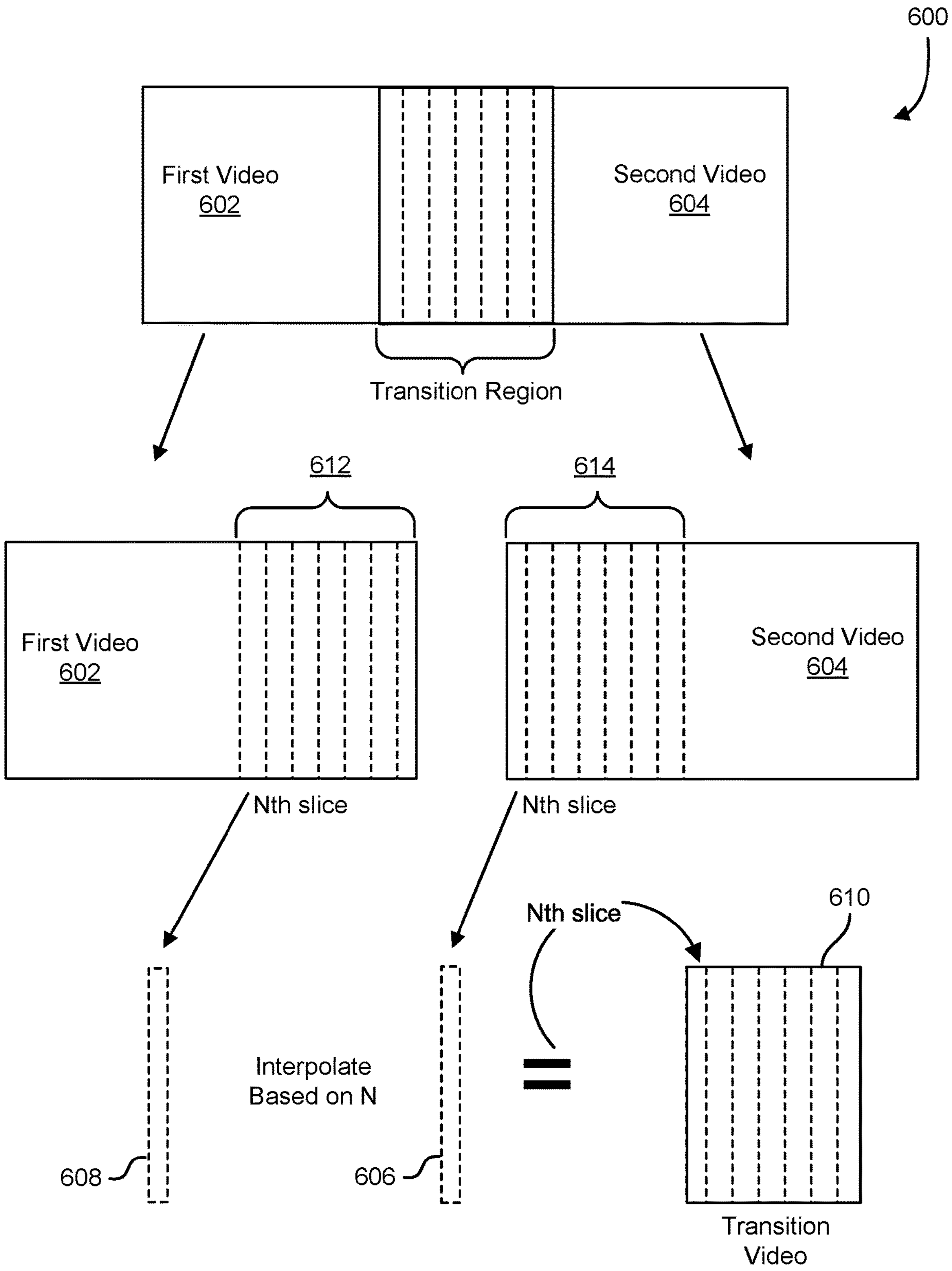
FIG. 6 illustrates an example of a process for generating a transition video by interpolating slices of an overlapping region, in an embodiment.

FIG. 6 illustrates an example of a process for generating a transition video by interpolating slices of an overlapping region, in an embodiment. In an embodiment, FIG. 6 depicts an example 600 of generating a transition video 610 by interpolating between slices of a first video 602 and a second video 604. In an embodiment, the transition video 610 can be generated by any suitable system, such as the video stitching system 202 described in connection with FIG. 2. In an embodiment, the system can be a computer system and/or graphics system, and can comprise one or more instances of a physical computing instance, such as a physical computer or device, or one or more instances of a virtual computing instance, such as a virtual machine, which can be hosted on one or more computer servers. Additionally, in an embodiment, the system can comprise various components and/or subsystems, such as one or more processors, memory storing instructions executable by the one or more processors, graphics subsystems, and/or variations thereof.

In an embodiment, the first video 602 and second video 604 can be videos recorded from the perspective of a vehicle, such as the vehicle 102 described in connection with FIG. 1. In an embodiment, the first video 602 and second video 604 can be videos that have been transformed and aligned onto a common viewing cylinder, forming a cylindrical view comprising the first video 602 and second video 604. In an embodiment, the transformation can be implemented through various operations, such as the operations the projection and flow estimation layer 210 described in connection with FIG. 2 comprises. In an embodiment, the cylindrical view formed from the first video 602 and second video 604 comprises a transition region, or overlapping region, in which a portion of the first video 602, which can be denoted as an overlap region of the first video 612, overlaps with a portion of the second video 604, which can be denoted as an overlap region of the second video 614. In an embodiment, the transition region can comprise various alignment, ghosting, and occlusion distortions due to the overlapping. Further information regarding the cylindrical view and transition regions can be found in the description of FIG. 3. In an embodiment, these distortions can be mitigated and/or resolved through the generation of the transition video 610 to be utilized in place of the transition region.

In an embodiment, flow fields are generated for the transition region. In an embodiment, a flow field refers to a field that denotes the change, or flow, between one image frame and another. In an embodiment, for example, one image frame can comprise a depiction of an object. In an embodiment, another image frame can comprise a depiction of the same object translated to the left. In an embodiment, a flow field between the two image frames can comprise vectors and/or other indications that denote the change of position of the object to the left between the two image frames.

In an embodiment, each frame that the transition region comprises corresponds to two frames, a frame from the overlap region of the first video 612, and a frame from the overlap region of the second video 614. In an embodiment, a frame of the transition region is processed and divided into slices. In an embodiment, each slice of the frame of the transition region corresponds to two slices, one slice from a corresponding frame of the overlap region of the first video 612 and another slice from a corresponding frame of the overlap region of the second video 614, In an embodiment, the slices of the frame of the transition region can be processed sequentially in various orders, such as beginning with the leftmost slice and finishing with the rightmost slice, beginning with the rightmost slice and finishing with the leftmost slice, and/or variations thereof. In an embodiment, an Nth slice 606 and an Nth slice 608 correspond to an Nth slice of the frame of the transition region being processed.

In an embodiment, a flow field, which can be denoted as $FlowField_{612\rightarrow 614}$, is generated for the flow from the corresponding frame of the overlap region of the first video 612 to the corresponding frame of the overlap region of the second video 614, and scaled by a ratio of N, corresponding to the Nth slice of the frame of the transition region being processed, to the total number of slices the frame of the transition region comprises. In an embodiment, an additional flow field, which can be denoted as $FlowField_{614\rightarrow 612}$, is generated for the flow from the corresponding frame of the overlap region of the second video 614 to the corresponding frame of the overlap region of the first video 612, and scaled by a difference between the value and a ratio of N, corresponding to the Nth slice of the frame of the transition region being processed, to the total number of slices the frame of the transition region comprises. In an embodiment, the scaling of the flow fields can be represented by the following formulas:

$$ScaledFlowField_{612\rightarrow 614} = FlowField_{612\rightarrow 614} * \left(\frac{N}{K}\right) \text{ and } ScaledFlowField_{614\rightarrow 612} = FlowField_{614\rightarrow 612} * \left(1 - \frac{N}{K}\right)$$

where K is the total number of slices the frame of the transition region comprises. In an embodiment, the $ScaledFlowField_{612\rightarrow 614}$ is utilized to warp the Nth slice 608, and the $ScaledFlowField_{614\rightarrow 612}$ is utilized to warp the Nth slice 606. In an embodiment, the slices can be warped by morphing the slices utilizing the flows indicated by the scaled flow fields.

In an embodiment, the warped slices are then blended together. In an embodiment, the warped slices can be blended utilizing a linear blending technique, in which weights can be assigned to each of the warped slices based on their position relative to the frame of the transition region; in an embodiment, the weights can determine how the warped slices are blended together to generate an interpolated slice. Additionally, in an embodiment, the warped slices can be blended utilizing various techniques, such as linear blending, non-linear blending, and/or variations thereof, in an embodiment, the process of interpolation utilizing the flow fields is utilized for each slice of the frame of the transition region; in an embodiment, each generated interpolated slice can be utilized to generate a frame of the transition video 610. Additionally, in an embodiment, the process of interpolation utilizing the flow fields can be implemented through various operations, such as the operations the interpolation layer 212 described in connection with FIG. 2 comprises.

In an embodiment, the generated frame of the transition video 610 is then refined utilizing various operations, such as the operations the image refinement layer 214 described in connection with FIG. 2 comprises. In an embodiment, the generated frame is refined utilizing a network that comprises an encoder-decoder architecture. In an embodiment, the network can comprise various convolutional layers, and utilize various techniques such as a skip connection process. In an embodiment, the skip connection process refers to a process in which various details of the unprocessed or minimally processed input are utilized to refine the details of the processed output. Additionally, in an embodiment, the network can be trained utilizing realistic synthetic data produced by an urban driving simulator. In an embodiment, various details from the frames of the unaltered first video 602 and unaltered second video 604 are utilized to enhance various aspects and details of the generated frame of the transition video 610.

In an embodiment, the process of generating flow fields, interpolating slices based on the flow fields, generating a frame of the transition video 610 from the interpolated slices, and refining the frame is repeated for each frame that the transition region comprises to generate a plurality of generated frames of the transition video 610. In an embodiment, the plurality of generated frames of the transition video 610 are utilized to form the transition video 610. In an embodiment, the transition video 610 can be utilized with the non-overlapping portions (i.e., portions outside of the overlap regions) of the first video 602 and second video 604 to form a panoramic video, such as the panoramic video described in connection with FIG. 4.

Figure 7:
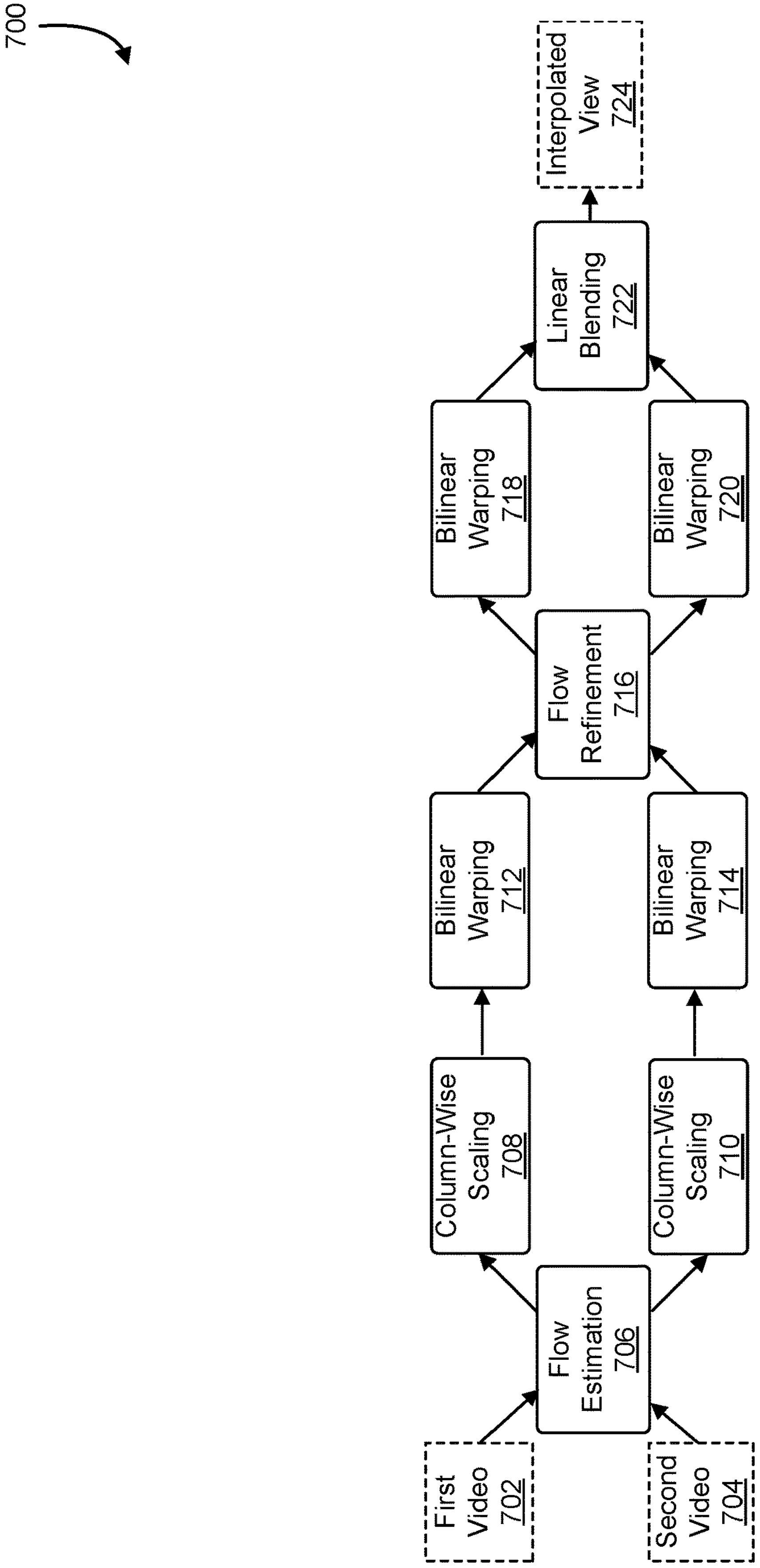
FIG. 7 illustrates an example of a network that generates an interpolated view of an overlapping video region, in an embodiment.

FIG. 7 illustrates an example of a network that generates an interpolated view of an overlapping video region, in an embodiment. In an embodiment, FIG. 7 depicts an example 700 of a network that implements a fast pushbroom interpolation layer comprising various operations that can be implemented by any suitable system, such as the video stitching system 202 described in connection with FIG. 2. In an embodiment, the system can be a computer system and/or graphics system, and can comprise one or more instances of a physical computing instance, such as a physical computer or device, or one or more instances of a virtual computing instance, such as a virtual machine, which can be hosted on one or more computer servers. Additionally, in an embodiment, the system can comprise various components and/or subsystems, such as one or more processors, memory storing instructions executable by the one or more processors, graphics subsystems, and/or variations thereof. In an embodiment, the fast pushbroom interpolation layer can be implemented through various operations such as the operations the interpolation layer 212 described in connection with FIG. 2 comprises.

In an embodiment, a first video 702 and a second video 704 can be videos recorded from the perspective of a vehicle, such as the vehicle 102 described in connection with FIG. 1. In an embodiment, the first video 702 and second video 704 can be videos that have been transformed and aligned onto a common viewing cylinder, forming a cylindrical view comprising the first video 702 and second video 704. In an embodiment, the transformation can be implemented through various operations, such as the operations the projection and flow estimation layer 210 described in connection with FIG. 2 comprises. In an embodiment, the cylindrical view formed from the first video 702 and second video 704 comprises a transition region, or overlapping video region, in which a portion of the first video 702, which can be denoted as an overlap region of the first video 702, overlaps with a portion of the second video 704, which can be denoted as an overlap region of the second video 704. In an embodiment, the transition region can comprise various alignment, ghosting, and occlusion distortions due to the overlapping. In an embodiment, these distortions can be mitigated and/or resolved through the generation of an interpolated view 724 from the first video 702 and second video 704.

In an embodiment, the fast pushbroom interpolation layer utilizes as inputs a frame from the first video 702, and a frame from the second video 704, and generates an interpolated view 724. In an embodiment, the frame from the first video 702 and the frame from the second video 704 comprise regions corresponding to a transition region. In an embodiment, the transition region corresponds to an overlap region of the frame from the first video 702 that overlaps with an overlap region of the frame from the second video 704. In an embodiment, a flow estimation 706 can determine flow fields from the overlap region of the frame from the first video 702 and the overlap region of the frame from the second video 704. In an embodiment, a flow field refers to a field that denotes the change, or flow, between one image frame and another. In an embodiment, the flow fields can be functions of x, in which x refers to the x-coordinate of the flow fields. In an embodiment, the transition region can be divided into a number of slices; in an embodiment, the total number of slices can be denoted as K. In an embodiment, the index of a slice can be denoted as k (e.g., k=1 corresponds to the first slice). In an embodiment, each slice of the transition region corresponds to two slices, one slice from the overlap region of the frame from the first video 702, and one slice from the overlap region of the frame from the second video 704.

In an embodiment, a flow field, which can be denoted as $\mathrm{FlowField}_{702\rightarrow704}(X)$, is generated for the flow from the overlap region of the frame from the first video 702 to the overlap region of the frame from the second video 704. In an embodiment, an additional flow field, which can be denoted as $\mathrm{FlowField}_{704\rightarrow702}(X)$, is generated for the flow from the overlap region of the frame from the second video 704 to the overlap region of the frame from the first video 702. In an embodiment, a column-wise scaling 708 can scale the $\mathrm{FlowField}_{702\rightarrow704}(X)$ and a column-wise scaling 710 can scale the $\mathrm{FlowField}_{704\rightarrow702}(X)$ In an embodiment, the flow fields can be scaled column by column, corresponding to the slices of the overlap regions, according to the following mathematical formulas: $\mathrm{ScaledFlowField}_{702\rightarrow704}(X)=\{a_k{*}\mathrm{FlowField}_{702\rightarrow704}(X),\ X_k\leq X<X_{k+1}\}$ and $\mathrm{ScaledFlowField}_{704\rightarrow702}(X)=\{(1-\alpha_k){*}\mathrm{FlowField}_{704\rightarrow702}(X),\ X_k\leq X<X_{k+1}\}$ where $a_k=k/K$, $X_k$ is the X-coordinate of the beginning of the slice indicated by the index k, K is the total number of slices, and 0<k≤K. For example, if the transition region comprises two slices (i.e., K=2), $$ScaledFlowField_{702\rightarrow704}(x)=\begin{cases}\frac{1}{2}*FlowField_{702\rightarrow704}(x), & x_1\leq x<x_2\\ \frac{2}{2}*FlowField_{702\rightarrow704}(x), & x_2\leq x<x_3\end{cases},$$

where $x_3$ denotes the X-coordinate of the end of the second slice, or where the third slice would hypothetically begin.

In an embodiment, the scaled flow fields can be utilized to warp the overlap region of the frame from the first video 702 and the overlap region of the frame from the second video 704 through a bilinear warping 712 and a bilinear warping 714, respectively. In an embodiment, the $\mathrm{ScaledFlowField}_{702\rightarrow704}(X)$ is utilized by the bilinear warping 712 to warp the overlap region of the frame from the first video 702. In an embodiment, the $\mathrm{ScaledFlowField}_{704\rightarrow702}(X)$ is utilized by the bilinear warping 714 to warp the overlap region of the frame from the second video 704. In an embodiment, the overlap regions of the frames from the first video 702 and second video 704 can be warped by morphing the overlap regions to follow the flows indicated by their respective scaled flow fields.

In an embodiment, the scaled flow fields can be refined in a flow refinement 716. In an embodiment, the flow refinement 716 analyzes the scaled flow fields and performs various operations to refine them; in an embodiment, these operations can comprise smoothing operations, various filters, and/or variations thereof. In an embodiment, the flow refinement 716 refines and/or modifies the $\mathrm{ScaledFlowField}_{702\rightarrow704}(x)$ and $\mathrm{ScaledFlowField}_{704\rightarrow702}(X)$ to generate a $\mathrm{RefinedScaledFlowField}_{702\rightarrow704}(X)$ and a $\mathrm{RefinedScaledFlowField}_{704\rightarrow702}(X)$.

In an embodiment, the flow refinement 716 additionally generates a visibility map. In an embodiment, the visibility map can be considered as a quality measure of the refined scaled flow fields $\mathrm{RefinedScaledFlowField}_{702\rightarrow704}(X)$ and $\mathrm{RefinedScaledFlowField}_{704\rightarrow702}(X)$. In an embodiment, the visibility map can be utilized prevent any potential ghosting artifacts in the interpolated view 724 due to occlusions. In an embodiment, the visibility map comprises features of overlap regions of the frames from the first video 702 and second video 704 that are intended to be visible in the interpolated view 724.

In an embodiment, the refined scaled flow fields can be utilized to warp the warped overlap region of the frame from the first video 702 and the warped overlap region of the frame from the second video 704 through a bilinear warping 718 and a bilinear warping 720, respectively. In an embodiment, the $\text{RefinedScaledField}_{702\rightarrow704}(X)$ is utilized by the bilinear warping 718 to warp the warped overlap region of the frame from the first video 702 to produce a refined warped overlap region of the frame from the first video 702. In an embodiment, the $\text{RefinedScaledFlowField}_{704\rightarrow702}(X)$ is utilized by the bilinear warping 720 to warp the warped overlap region of the frame from the second video 704 to produce a refined warped overlap region of the frame frame the second video 704. In an embodiment, the warped transition regions of the frames from the first video 702 and second video 704 can be warped by morphing the warped transition regions to follow the flows indicated by their respective refined scaled flow fields.

In an embodiment, a linear blending 722 blends the refined warped overlap region of the frame from the first video 702 with the refined warped overlap region of the frame from the second video 704 utilizing the visibility map generated in the flow refinement 716. In an embodiment, the linear blending 722 can comprise various blending operations that utilize the visibility map. In an embodiment, the visibility map is utilized to scale and blend the refined warped overlap region of the frame from the first video 702 and the refined warped overlap region of the frame from the second video 704 together linearly to produce the interpolated view 724. In an embodiment, the linear blending 722 can be represented by the following formula:

$$\text{Interpolated View } 724=(V)*(\text{RWOR}_{702})+(1-V)*(\text{RWOR}_{704}),$$

in which V denotes the visibility map, $\text{RWOR}_{702}$ denotes the refined warped overlap region of the frame from the first video 702, and $\text{RWOR}_{704}$ denotes the refined warped overlap region of the frame from the second video 704.

In an embodiment, the interpolated view 724 can be refined utilizing an image refinement network. In an embodiment, the image refinement network can be a network that comprises an encoder-decoder architecture. In an embodiment, the network can comprise various convolutional layers, and utilize various techniques such as a skip connection process. In an embodiment, the skip connection process can utilize various details from the frames of the unaltered first video 702 and unaltered second video 704 to enhance various aspects and details of the interpolated view 724. In an embodiment, the image refinement network can be trained to efficiently refine various details of the interpolated view 724. In an embodiment, the image refinement network is trained using realistic synthetic data produced by an urban driving simulator.

In an embodiment, the refined interpolated view 724 is joined with the remaining regions of the frames from the first video 702 and second video 704 (i.e., the regions outside the overlap regions). In an embodiment, the processes described above of the fast pushbroom interpolation layer are repeated for every frame of the first video 702 and second video 704 to form a transition video. In an embodiment, the fast pushbroom interpolation layer performs the interpolation processes more efficiently than the interpolation processes described in connection with FIG. 6. In an embodiment, the fast pushbroom interpolation layer interpolates between entire overlap regions to produce an interpolated overlap region (i.e., interpolated view), as opposed to the interpolation processes described in connection with FIG. 6, in which interpolation is done between slices of overlap regions in multiple processes for all of the slices of the overlap regions, and the interpolated slices are joined to produce an interpolated overlap region.

Figure 8:
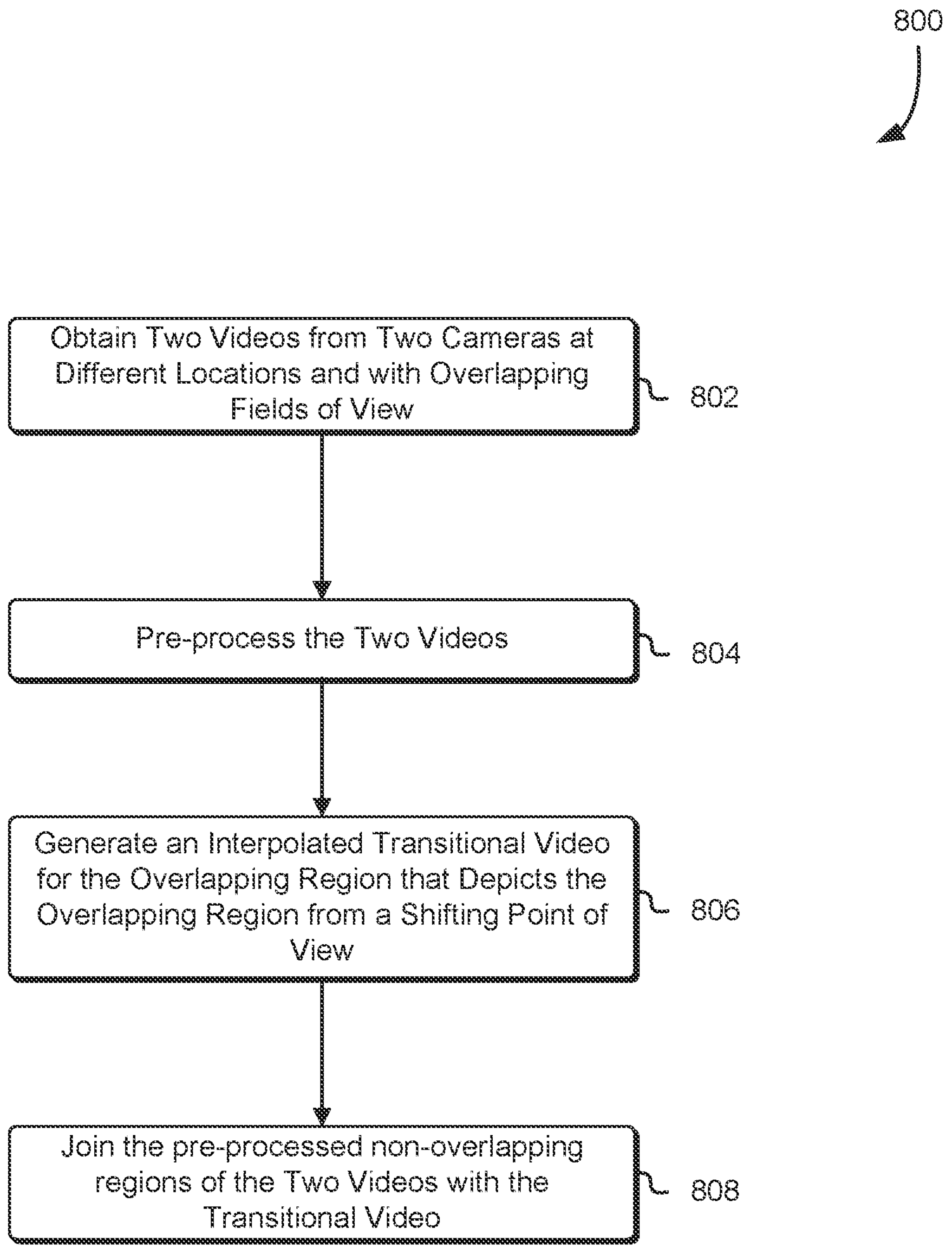
FIG. 8 illustrates an example of a process that, as a result of being performed by a computer system, creates a panoramic video image, in an embodiment.

FIG. 8 illustrates an example of a process that, as a result of being performed by a computer system, creates a panoramic video image, in an embodiment. In an embodiment, a process 800 begins at block 802 with a computer system Obtaining two videos from two cameras at different locations, where the two cameras have overlapping fields of view. In an embodiment, the cameras are mounted to a motor vehicle, and are mounted to different locations on the motor vehicle. For example, in one embodiment, cameras may be mounted to the right side, left side, and front center of the motor vehicle and to provide wide-angle video coverage around the vehicle. Various embodiments are particularly well-suited where the cameras are spaced apart from each other, as the system is tolerant to parallax error introduced by such configurations. In an embodiment, in addition to the overlapping region associated with the overlapping field of view, each camera has a non-overlapping region not covered by other cameras.

In an embodiment, at block 804, the system preprocesses the video acquired from the cameras by translating the each video so that it appears to be acquired from a common point. In an embodiment, each video is then projected on a cylinder at infinity, centered around a common point.

In an embodiment, at block 806, the computer system generates a transitional video for the overlapping region. In an embodiment, the transitional video is generated using a pushbroom interpolation method wherein the overlapping portions of each video are sliced vertically and corresponding slices from each video are used to produce an interpolation (or estimated intermediate frame) of the two slices. In an embodiment, the ratio of the interpolation (or position of the intermediate) between the two slices varies across the width of the transitional video so that the transitional video provides a smooth transition between the viewpoints of the two videos.

In an embodiment, the transitional video is produced by a neural network that is been trained to produce such an interpolation. In an embodiment, the training data is acquired by use of the simulator that includes a plurality of virtual cameras between simulated cameras that represent the actual cameras in the system. In an embodiment, footage from the virtual cameras represents the intermediate views, and slices from the virtual cameras are used to generate ground truth transitional videos that are provided to the neural network for training.

In an embodiment, at block 808, the nonoverlapping portions of the two videos are joined with the transitional video to produce a single panoramic video. In an embodiment, the panoramic video, while distorted in certain aspects, provides a smooth transition between the cameras and avoids various harsh artifacts such as ghosting, vanishing objects, and severe warping, associated with other methods.

In an embodiment, the process described above may be used to combine images obtained from a variety of sources. For example, in an embodiment, the system described above may be used to combine an image generated in a simulation with an image collected in the real world. In an embodiment, the panoramic video is displayed on a display unit such as a display and a vehicle, telepresence conference room, or virtual reality interface.

Figure 9:
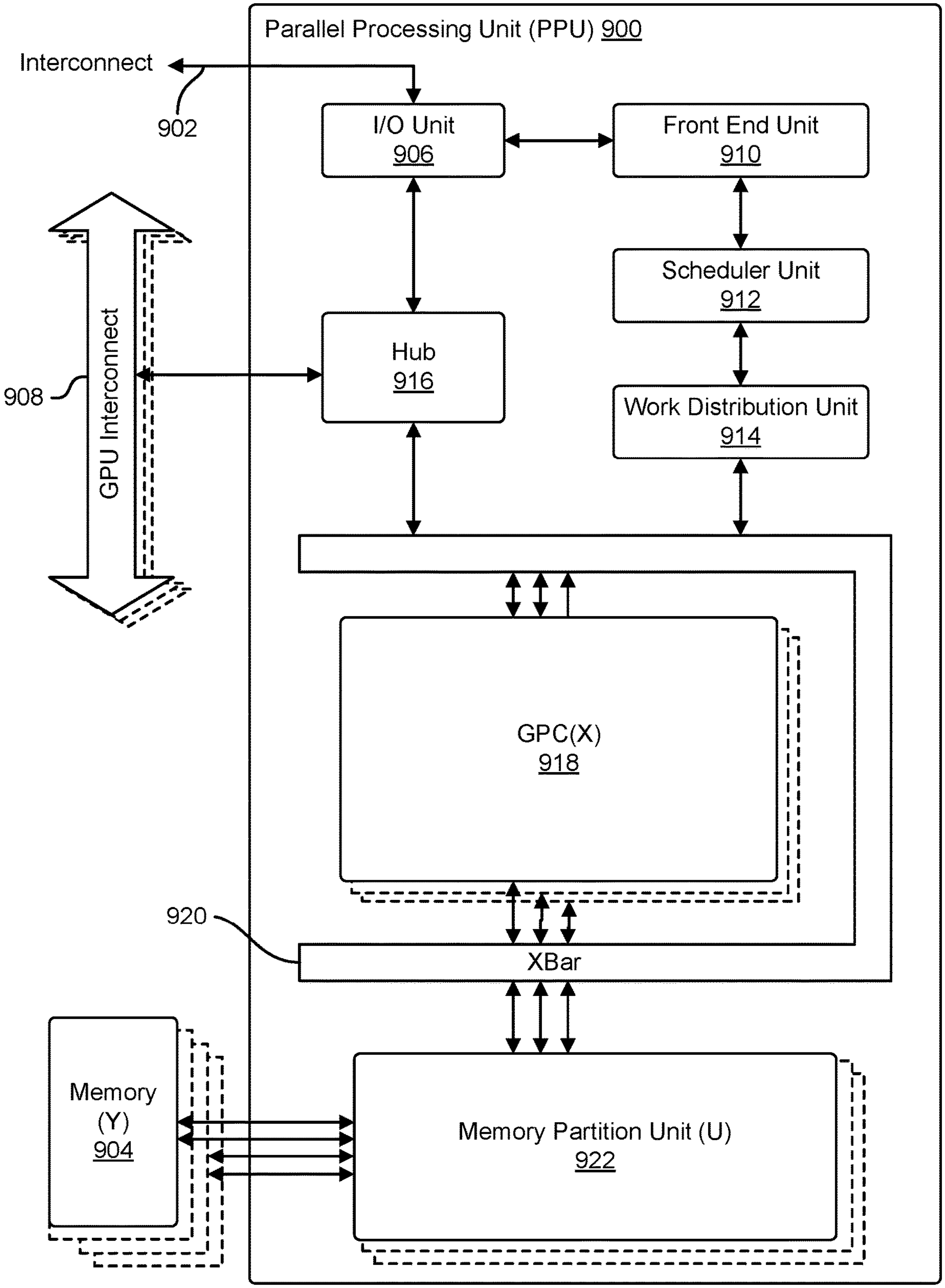
FIG. 9 illustrates an example of parallel processing unit ("PPU"), in accordance with an embodiment.

FIG. 9 illustrates a parallel processing unit ("PPU") 900, in accordance with one embodiment. In an embodiment, the PPU 900 is configured with machine-readable code that, if executed by the PPU, causes the PPU to perform some or all of processes and techniques described throughout this disclosure. In an embodiment, the PPU 900 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In an embodiment, a thread refers to a thread of execution and is an instantiation of a set of instructions configured to be executed by the PPU 900. In an embodiment, the PPU 900 is a graphics processing unit ("GPU") configured to implement a graphics rendering pipeline for processing three-dimensional ("3D") graphics data in order to generate two-dimensional ("2D") image data for display on a display device such as a liquid crystal display (LCD) device. In an embodiment, the PPU 900 is utilized to perform computations such as linear algebra operations and machine-learning operations. FIG. 9 illustrates an example parallel processor for illustrative purposes only and should be construed as a non-limiting example of processor architectures contemplated within the scope of this disclosure and that any suitable processor may be employed to supplement and/or substitute for the same.

In an embodiment, one or more PPUs are configured to accelerate High Performance Computing ("HPC"), data center, and machine learning applications. In an embodiment, the PPU 900 is configured to accelerate deep learning systems and applications including the following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In an embodiment, the PPU 900 includes an Input/Output ("I/O") unit 906, a front-end unit 910, a scheduler unit 912, a work distribution unit 914, a hub 916, a crossbar ("Xbar") 920, one or more general processing clusters ("GPCs") 918, and one or more partition units 922. In an embodiment, the PPU 900 is connected to a host processor or other PPUs 900 via one or more high-speed GPU interconnects 908. In an embodiment, the PPU 900 is connected to a host processor or other peripheral devices via an interconnect 902. In an embodiment, the PPU 900 is connected to a local memory comprising one or more memory devices 904. In an embodiment, the local memory comprises one or more dynamic random access memory ("DRAM") devices. In an embodiment, the one or more DRAM devices are configured and/or configurable as high-bandwidth memory ("HBM") subsystems, with multiple DRAM dies stacked within each device.

The high-speed GPU interconnect 908 may refer to a wire-based multi-lane communications link that is used by systems to scale and include one or more PPUs 900 combined with one or more CPUs, supports cache coherence between the PPUs 900 and CPUs, and CPU mastering. In an embodiment, data and/or commands are transmitted by the high-speed GPU interconnect 908 through the hub 916 to/from other units of the PPU 900 such as one or more copy engines, video encoders, video decoders, power management units, and other components which may not be explicitly illustrated in FIG. 9.

In an embodiment, the I/O unit 906 is configured to transmit and receive communications (e.g., commands, data) from a host processor (not illustrated in FIG. 9) over the system bus 902. In an embodiment, the I/O unit 906 communicates with the host processor directly via the system bus 902 or through one or more intermediate devices such as a memory bridge, in an embodiment, the I/O unit 906 may communicate with one or more other processors, such as one or more of the PPUs 900 via the system bus 902. In an embodiment, the I/O unit 906 implements a Peripheral Component Interconnect Express ("PCIe") interface for communications over a PCIe bus. In an embodiment, the I/O unit 906 implements interfaces for communicating with external devices.

In an embodiment, the I/O unit 906 decodes packets received via the system bus 902. In an embodiment, at least some packets represent commands configured to cause the PPU 900 to perform various operations. In an embodiment, the I/O unit 906 transmits the decoded commands to various other units of the PPU 900 as specified by the commands. In an embodiment, commands are transmitted to the front-end unit 910 and/or transmitted to the hub 916 or other units of the PPU 900 such as one or more copy engines, a video encoder, a video decoder, a power management unit, etc. (not explicitly illustrated in FIG. 9). In an embodiment, the I/O unit 906 is configured to route communications between and among the various logical units of the PPU 900.

In an embodiment, a program executed by the host processor encodes a command stream in a buffer that provides workloads to the PPU 900 for processing. In an embodiment, a workload comprises instructions and data to be processed by those instructions. In an embodiment, the buffer is a region in a memory that is accessible (e.g., read/write) by both the host processor and the PPU 900 the host interface unit may be configured to access the buffer in a system memory connected to the system bus 902 via memory requests transmitted over the system bus 902 by the 10 unit 906. In an embodiment, the host processor writes the command stream to the buffer and then transmits a pointer to the start of the command stream to the PPU 900 such that the front-end unit 910 receives pointers to one or more command streams and manages the one or more streams, reading commands from the streams and forwarding commands to the various units of the PPU 900.

In an embodiment, the front-end unit 910 is coupled to a scheduler unit 912 that configures the various GPCs 918 to process tasks defined by the one or more streams. In an embodiment, the scheduler unit 912 is configured to track state information related to the various tasks managed by the scheduler unit 912 where the state information may indicate which GPC 918 a task is assigned to, whether the task is active or inactive, a priority level associated with the task, and so forth. In an embodiment, the scheduler unit 912 manages the execution of a plurality of tasks on the one or more GPCs 918.

In an embodiment, the scheduler unit 912 is coupled to a work distribution unit 914 that is configured to dispatch tasks for execution on the GPCs 918. In an embodiment, the work distribution unit 914 tracks a number of scheduled tasks received from the scheduler unit 912 and the work distribution unit 914 manages a pending task pool and an active task pool for each of the GPCs 918. In an embodiment, the pending task pool comprises a number of slots (e.g., 32 slots) that contain tasks assigned to be processed by a particular GPC 918; the active task pool may comprise a number of slots (e.g., 4 slots) for tasks that are actively being processed by the GPCs 918 such that as a GPC 918 completes the execution of a task, that task is evicted from the active task pool for the GPC 918 and one of the other tasks from the pending task pool is selected and scheduled for execution on the GPC 918. In an embodiment, if an active task is idle on the GPC 918, such as while waiting for a data dependency to be resolved, then the active task is evicted from the GPC 918 and returned to the pending task pool while another task in the pending task pool is selected and scheduled for execution on the GPC 918.

In an embodiment, the work distribution unit 914 communicates with the one or more GPCs 918 via XBar 920. In an embodiment, the XBar 920 is an interconnect network that couples many of the units of the PPU 900 to other units of the PPU 900 and can be configured to couple the work distribution unit 914 to a particular GPC 918. Although not shown explicitly, one or more other units of the PPU 900 may also be connected to the XBar 920 via the hub 916.

The tasks are managed by the scheduler unit 912 and dispatched to a GPC 918 by the work distribution unit 914. The GPC 918 is configured to process the task and generate results. The results may be consumed by other tasks within the GPC 918, routed to a different GPC 918 via the XBar 920, or stored in the memory 904. The results can be written to the memory 904 via the partition units 922, which implement a memory interface for reading and writing data to/from the memory 904. The results can be transmitted to another PPU 904 or CPU via the high-speed GPU interconnect 908. In an embodiment, the PPU 900 includes a number U of partition units 922 that is equal to the number of separate and distinct memory devices 904 coupled to the PPU 900. A partition unit 922 will be described in more detail below in conjunction with FIG. 11.

In an embodiment, a host processor executes a driver kernel that implements an application programming interface ("API") that enables one or more applications executing on the host processor to schedule operations for execution on the PPU 900. In an embodiment, multiple compute applications are simultaneously executed by the PPU 900 and the PPU 900 provides isolation, quality of service ("QoS"), and independent address spaces for the multiple compute applications. In an embodiment, an application generates instructions (e.g., in the form of API calls) that cause the driver kernel to generate one or more tasks for execution by the PPU 900 and the driver kernel outputs tasks to one or more streams being processed by the PPU 900. In an embodiment, each task comprises one or more groups of related threads, which may be referred to as a warp. In an embodiment, a warp comprises a plurality of related threads (e.g., 32 threads) that can be executed in parallel. In an embodiment, cooperating threads can refer to a plurality of threads including instructions to perform the task and that exchange data through shared memory. Threads and cooperating threads are described in more detail, in accordance with one embodiment, elsewhere in the present application.

Figure 10:
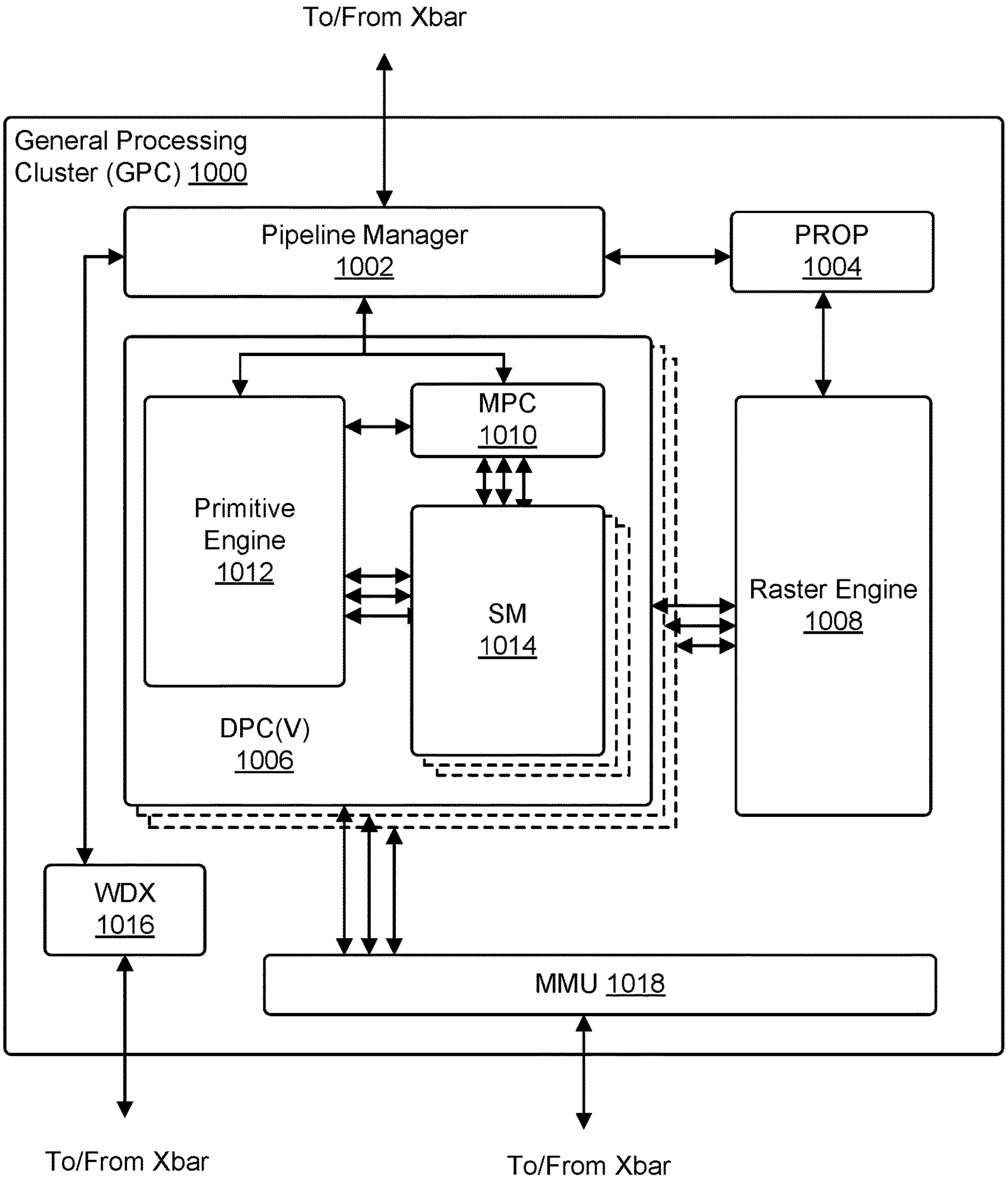
FIG. 10 illustrates an example of a general processing cluster ("GPC"), in accordance with one embodiment.

FIG. 10 illustrates a GPC 1000 such as the GPC illustrated of the PPU 1000 of FIG. 10, in accordance with one embodiment. In an embodiment, each GPC 1000 includes a number of hardware units for processing tasks and each GPC 1000 includes a pipeline manager 1002, a pre-raster operations unit ("PROP") 1004, a raster engine 1008, a work distribution crossbar ("WDX") 1016, a memory management unit ("MMU") 1018, one or more Data Processing Clusters ("DPCs") 1006, and any suitable combination of parts. It will be appreciated that the GPC 1000 of FIG. 10 may include other hardware units in lieu of or in addition to the units shown in FIG. 10.

In an embodiment, the operation of the GPC 1000 is controlled by the pipeline manager 1002. The pipeline manager 1002 manages the configuration of the one or more DPCs 1006 for processing tasks allocated to the GPC 1000. In an embodiment, the pipeline manager 1002 configures at least one of the one or more DPCs 1006 to implement at least a portion of a graphics rendering pipeline. In an embodiment, a DPC 1006 is configured to execute a vertex shader program on the programmable streaming multiprocessor ("SM") 1014. The pipeline manager 1002 is configured to route packets received from a work distribution to the appropriate logical units within the GPC 1000, in an embodiment, and some packets may be routed to fixed function hardware units in the PROP 1004 and/or raster engine 1008 while other packets may be routed to the DPCs 1006 for processing by the primitive engine 1012 or the SM 1014. In an embodiment, the pipeline manager 1002 configures at least one of the one or more DPCs 1006 to implement a neural network model and/or a computing pipeline.

The PROP unit 1004 is configured, in an embodiment, to route data generated by the raster engine 1008 and the DPCs 1006 to a Raster Operations ("ROP") unit in the memory partition unit, described in more detail above. In an embodiment, the PROP unit 1004 is configured to perform optimizations for color blending, organize pixel data, perform address translations, and more. The raster engine 1008 includes a number of fixed function hardware units configured to perform various raster operations, in an embodiment, and the raster engine 1008 includes a setup engine, a coarse raster engine, a culling engine, a clipping engine, a fine raster engine, a tile coalescing engine, and any suitable combination thereof. The setup engine, in an embodiment, receives transformed vertices and generates plane equations associated with the geometric primitive defined by the vertices; the plane equations are transmitted to the coarse raster engine to generate coverage information (e.g., an x, y coverage mask for a tile) for the primitive; the output of the coarse raster engine is transmitted to the culling engine where fragments associated with the primitive that fail a z-test are culled, and transmitted to a clipping engine where fragments lying outside a viewing frustum are clipped. In an embodiment, the fragments that survive clipping and culling are passed to the fine raster engine to generate attributes for the pixel fragments based on the plane equations generated by the setup engine. In an embodiment, the output of the raster engine 1008 comprises fragments to be processed by any suitable entity such as by a fragment shader implemented within a DPC 1006.

In an embodiment, each DPC 1006 included in the GPC 1000 comprises an M-Pipe Controller ("MPC") 1010; a primitive engine 1012; one or more SMs 1014; and any suitable combination thereof. In an embodiment, the MPC 1010 controls the operation of the DPC 1006, routing packets received from the pipeline manager 1002 to the appropriate units in the DPC 1006. In an embodiment, packets associated with a vertex are routed to the primitive engine 1012, which is configured to fetch vertex attributes associated with the vertex from memory; in contrast, packets associated with a shader program may be transmitted to the SM 1014.

In an embodiment, the SM 1014 comprises a programmable streaming processor that is configured to process tasks represented by a number of threads. In an embodiment, the SM 1014 is multi-threaded and configured to execute a plurality of threads (e.g., 32 threads) from a particular group of threads concurrently and implements a SIMD (Single-Instruction, Multiple-Data) architecture where each thread in a group of threads (e.g., a warp) is configured to process a different set of data based on the same set of instructions. In an embodiment, all threads in the group of threads execute the same instructions. In an embodiment, the SM 1014 implements a SIMT (Single-Instruction, Multiple Thread) architecture wherein each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge, in another embodiment, a program counter, call stack, and execution state is maintained for each individual thread, enabling equal concurrency between all threads, within and between warps. In an embodiment, execution state is maintained for each individual thread and threads executing the same instructions may be converged and executed in parallel for better efficiency. In an embodiment, the SM 1014 is described in more detail below.

In an embodiment, the MMU 1018 provides an interface between the GPC 1000 and the memory partition unit and the MMU 1018 provides translation of virtual addresses into physical addresses, memory protection, and arbitration of memory requests. In an embodiment, the MMU 1018 provides one or more translation lookaside buffers ("TLBs") for performing translation of virtual addresses into physical addresses in memory.

Figure 11:
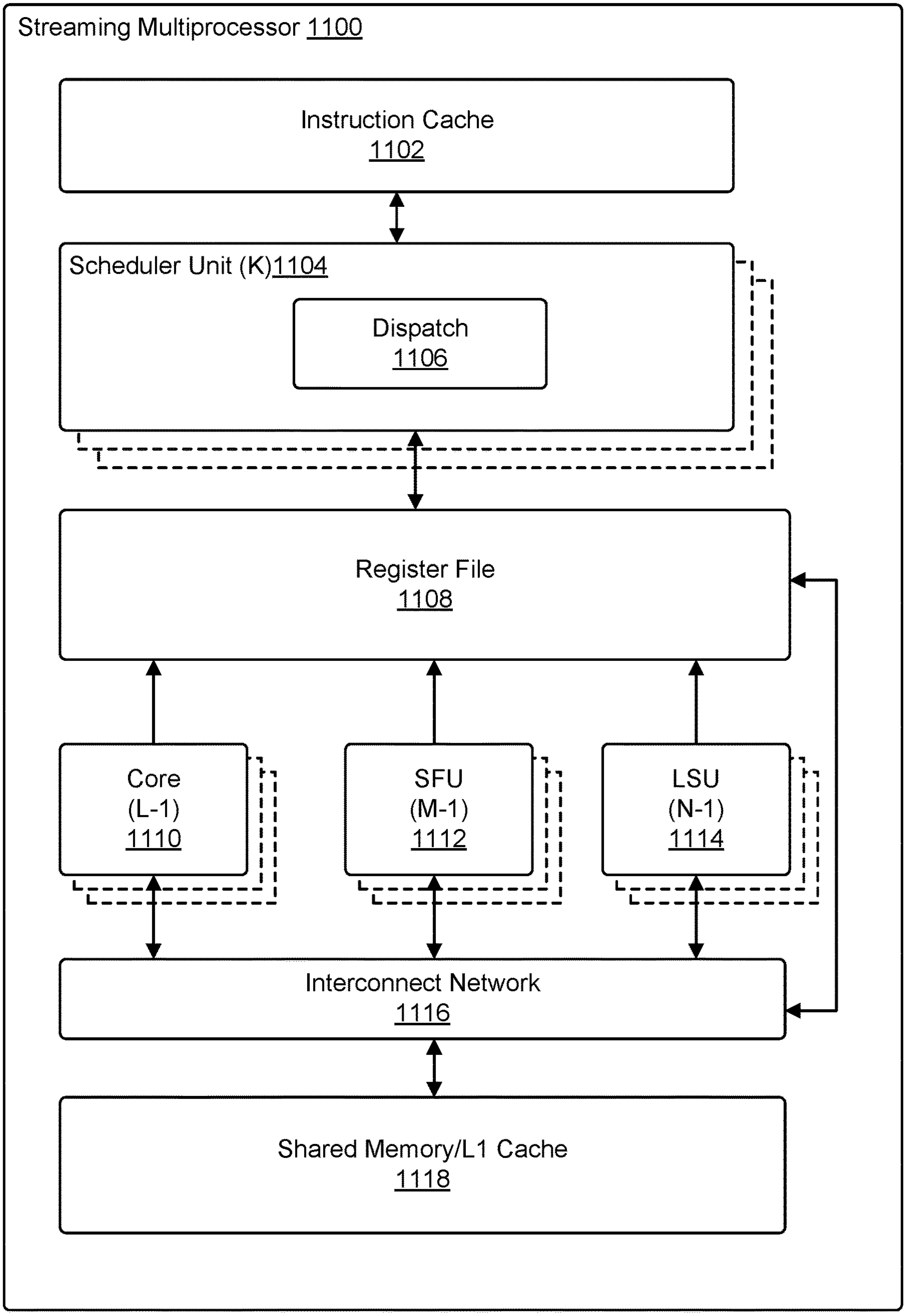
FIG. 11 illustrates an example of a streaming multi-processor, in accordance with one embodiment.

FIG. 11 illustrates a streaming multi-processor such as the streaming multi-processor of FIG. 10, in accordance with one embodiment. In an embodiment, the SM 1100 includes: an instruction cache 1102; one or more scheduler units 1104; a register file 1108; one or more processing cores 1110; one or more special function units ("SFUs") 1112; one or more load/store units ("LSUs") 1114; an interconnect network 1116; a shared memory/L1 cache 1118; and any suitable combination thereof. In an embodiment, the work distribution unit dispatches tasks for execution on the GPCs of the PPU and each task is allocated to a particular DPC within a GPC and, if the task is associated with a shader program, the task is allocated to an SM 1100. In an embodiment, the scheduler unit 1104 receives the tasks from the work distribution unit and manages instruction scheduling for one or more thread blocks assigned to the SM 1100. In an embodiment, the scheduler unit 1104 schedules thread blocks for execution as warps of parallel threads, wherein each thread block is allocated at least one warp. In an embodiment, each warp executes threads. In an embodiment, the scheduler unit 1104 manages a plurality of different thread blocks, allocating the warps to the different thread blocks and then dispatching instructions from the plurality of different cooperative groups to the various functional units (e.g., cores 1110, SFUs 1112, and LSUs 1114) during each clock cycle.

Cooperative Groups may refer to a programming model for organizing groups of communicating threads that allows developers to express the granularity at which threads are communicating, enabling the expression of richer, more efficient parallel decompositions. In an embodiment, cooperative launch APIs support synchronization amongst thread blocks for the execution of parallel algorithms. In an embodiment, applications of conventional programming models provide a single, simple construct for synchronizing cooperating threads: a barrier across all threads of a thread block (e.g., the syncthreads( )function). However, programmers would often like to define groups of threads at smaller than thread block granularities and synchronize within the defined groups to enable greater performance, design flexibility, and software reuse in the form of collective group-wide function interfaces. Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

In an embodiment, a dispatch unit 1106 is configured to transmit instructions to one or more of the functional units and the scheduler unit 1104 includes two dispatch units 1106 that enable two different instructions from the same warp to be dispatched during each clock cycle, in an embodiment, each scheduler unit 1104 includes a single dispatch unit 1106 or additional dispatch units 1106.

Each SM 1100, in an embodiment, includes a register file 1108 that provides a set of registers for the functional units of the SM 1100. In an embodiment, the register file 1108 is divided between each of the functional units such that each functional unit is allocated a dedicated portion of the register file 1108. In an embodiment, the register file 1108 is divided between the different warps being executed by the SM 1100 and the register file 1108 provides temporary storage for operands connected to the data paths of the functional units. In an embodiment, each SM 1100 comprises a plurality of L processing cores 1110. In an embodiment, the SM 1100 includes a large number (e.g., 128 or more) of distinct processing cores 1110. Each core 1110, in an embodiment, includes a fully-pipelined, single-precision, double-precision, and/or mixed precision processing unit that includes a floating point arithmetic logic unit ("ALU") and an integer arithmetic logic unit. In an embodiment, the floating point arithmetic logic units implement the IEEE 754-2008 standard for floating point arithmetic. In an embodiment, the cores 1110 include 64 single-precision (32-bit) floating point cores, 64 integer cores, 32 double-precision (64-bit) floating point cores, and 8 tensor cores.

In an embodiment, an ALU can include statefull logic such as a neural network, convolutional neural network, auto encoder, or application-specific logic that performs functions in addition to arithmetic and logical functions. In an embodiment, an ALU is a neural network trained to produce an image as described elsewhere in the present document. In an embodiment, an ALU can be configured by adding opcodes and combinational logic to perform said opcodes, through the use of microcode, or through the use of executable instructions executed by the processor.

Tensor cores are configured to perform matrix operations in accordance with an embodiment. In an embodiment, one or more tensor cores are included in the cores 1110. In an embodiment, the tensor cores are configured to perform deep learning matrix arithmetic, such as convolution operations for neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B are 16-bit floating point matrices and the accumulation matrices C and D are 16-bit floating point or 32-bit floating point matrices. In an embodiment, the tensor cores operate on 16-bit floating point input data with 32-bit floating point accumulation. In an embodiment, the 16-bit floating point multiply requires 64 operations and results in a full precision product that is then accumulated using 32-bit floating point addition with the other intermediate products for a 4×4×4 matrix multiply. Tensor cores are used to perform much larger two-dimensional or higher dimensional matrix operations, built up from these smaller elements, in an embodiment. In an embodiment, an API, such as CUDA 9 C++ API, exposes specialized matrix load, matrix multiply and accumulate, and matrix store operations to efficiently use tensor cores from a CUDA-C++ program. In an embodiment, at the CUDA level, the warp-level interface assumes 16×16 size matrices spanning all 32 threads of the warp.

In an embodiment, each SM 1100 comprises M SFUs 1112 that perform special functions (e.g., attribute evaluation, reciprocal square root, and the like). In an embodiment, the SFUs 1112 include a tree traversal unit configured to traverse a hierarchical tree data structure. In an embodiment, the SFUs 1112 include texture unit configured to perform texture map filtering operations. In an embodiment, the texture units are configured to load texture maps (e.g., a 2D array of texels) from the memory and sample the texture maps to produce sampled texture values for use in shader programs executed by the SM 1100. In an embodiment, the texture maps are stored in the shared memory/L1 cache. The texture units implement texture operations such as filtering operations using mip-maps (e.g., texture maps of varying levels of detail), in accordance with one embodiment. In an embodiment, each SM 1100 includes two texture units.

Each SM 1100 comprises N LSUs that implement load and store operations between the shared memory/L1 cache 1106 and the register file 1108, in an embodiment, Each SM 1100 includes an interconnect network 1116 that connects each of the functional units to the register file 1108 and the LSU 1114 to the register file 1108, shared memory/L1 cache 1118 in an embodiment. In an embodiment, the interconnect network 1116 is a crossbar that can be configured to connect any of the functional units to any of the registers in the register file 1108 and connect the LSUs 1114 to the register file and memory locations in shared memory/L1 cache 1118.

The shared memory/L1 cache 1118 is an array of on-chip memory that allows for data storage and communication between the SM 1100 and the primitive engine and between threads in the SM 1100 in an embodiment. In an embodiment, the shared memory/L1 cache 1118 comprises 128 KB of storage capacity and is in the path from the SM 1100 to the partition unit. The shared memory/L1 cache 1118, in an embodiment, is used to cache reads and writes. One or more of the shared memory/L1 cache 1118, L2 cache, and memory are backing stores.

Combining data cache and shared memory functionality into a single memory block provides improved performance for both types of memory accesses, in an embodiment. The capacity, in an embodiment, is used or is usable as a cache by programs that do not use shared memory, such as if shared memory is configured to use half of the capacity, texture and load/store operations can use the remaining capacity. Integration within the shared memory/L1 cache 1118 enables the shared memory/L1 cache 1118 to function as a high-throughput conduit for streaming data while simultaneously providing high-bandwidth and low-latency access to frequently reused data, in accordance with an embodiment. When configured for general purpose parallel computation, a simpler configuration can be used compared with graphics processing. In an embodiment, fixed function graphics processing units are bypassed, creating a much simpler programming model. In the general purpose parallel computation configuration, the work distribution unit assigns and distributes blocks of threads directly to the DPCs, in an embodiment. The threads in a block execute the same program, using a unique thread ID in the calculation to ensure each thread generates unique results, using the SM 1100 to execute the program and perform calculations, shared memory/L1 cache 1118 to communicate between threads, and the LSU 1114 to read and write global memory through the shared memory/L1 cache 1118 and the memory partition unit, in accordance with one embodiment. In an embodiment, when configured for general purpose parallel computation, the SM 1100 writes commands that the scheduler unit can use to launch new work on the DPCs.

In an embodiment, the PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In an embodiment, the PPU is embodied on a single semiconductor substrate. In an embodiment, the PPU is included in a system-on-a-chip ("SoC") along with one or more other devices such as additional PPUs, the memory, a reduced instruction set computer ("RISC") CPU, a memory management unit ("MMU"), a digital-to-analog converter ("DAC"), and the like.

In an embodiment, the PPU may be included on a graphics card that includes one or more memory devices. The graphics card may be configured to interface with a PCIe slot on a motherboard of a desktop computer. In yet another embodiment, the PPU may be an integrated graphics processing unit ("iGPU") included in the chipset of the motherboard.

Figure 12:
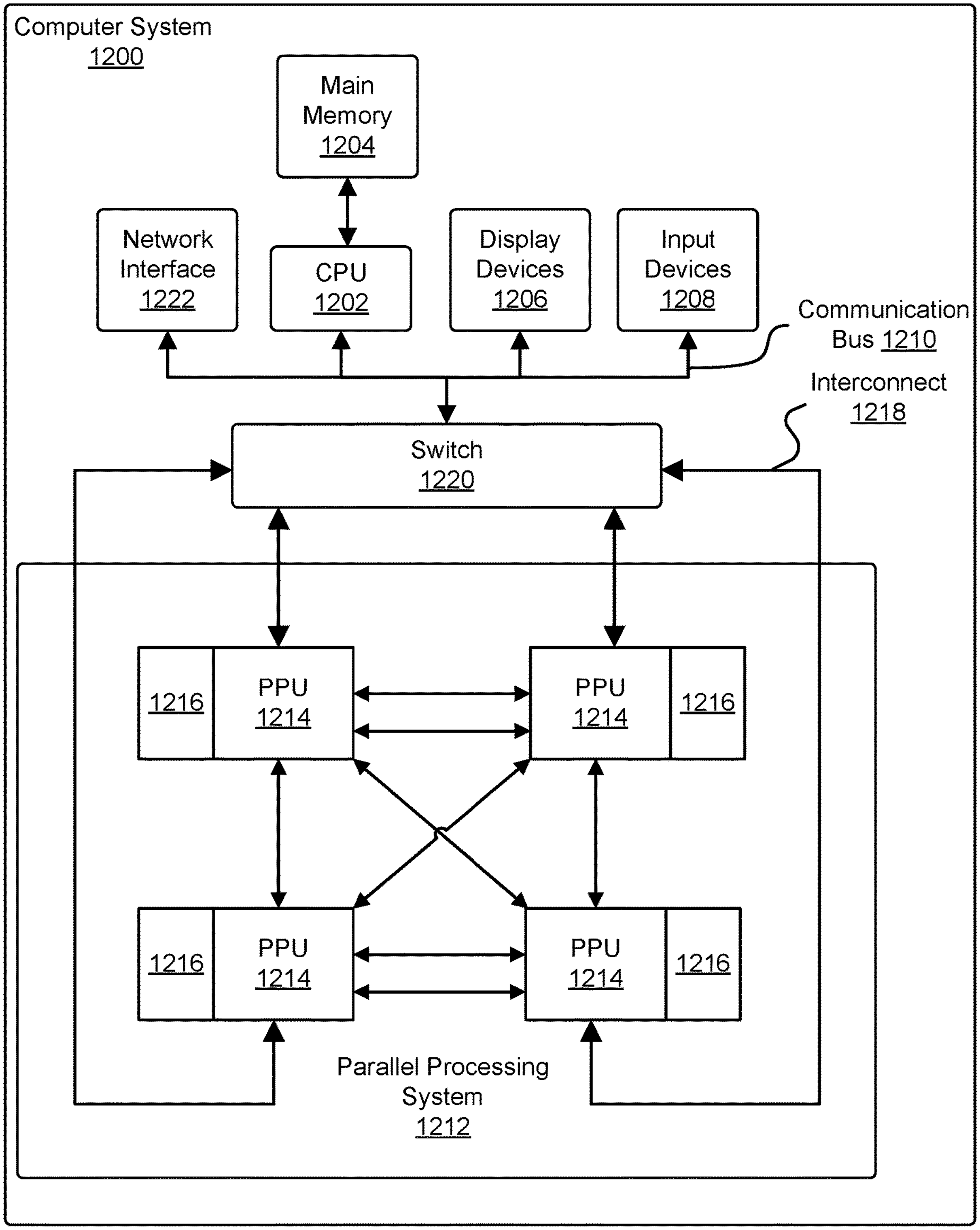
FIG. 12 illustrates a computer system in which the various examples can be implemented, in accordance with one embodiment.

FIG. 12 illustrates a computer system 1200 in which the various architecture and/or functionality can be implemented, in accordance with one embodiment. The computer system 1200, in an embodiment, is configured to implement various processes and methods described throughout this disclosure.

In an embodiment, the computer system 1200 comprises at least one central processing unit 1202 that is connected to a communication bus 1210 implemented using any suitable protocol, such as PCI (Peripheral Component Interconnect), PCI-Express, AGP (Accelerated Graphics Port), HyperTransport, or any other bus or point-to-point communication protocol(s). In an embodiment, the computer system 1200 includes a main memory 1204 and control logic (e.g., implemented as hardware, software, or a combination thereof) and data are stored in the main memory 1204 which may take the form of random access memory ("RAM"). In an embodiment, a network interface subsystem 1222 provides an interface to other computing devices and networks for receiving data from and transmitting data to other systems from the computer system 1200.

The computer system 1200, in an embodiment, includes input devices 1208, the parallel processing system 1211, and display devices 1206 which can be implemented using a conventional CRT (cathode ray tube), LCD (liquid crystal display), LED light emitting diode), plasma display, or other suitable display technologies. In an embodiment, user input is received from input devices 1208 such as keyboard, mouse, touchpad, microphone, and more. In an embodiment, each of the foregoing modules can be situated on a single semiconductor platform to form a processing system.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit ("CPU") and bus implementation. Of course, the various modules may also be situated separately or in various combinations of semiconductor platforms per the desires of the user.

In an embodiment, computer programs in the form of machine-readable executable code or computer control logic algorithms are stored in the main memory 1204 and/or secondary storage. Computer programs, if executed by one or more processors, enable the system 1200 to perform various functions in accordance with one embodiment. The memory 1204, the storage, and/or any other storage are possible examples of computer-readable media. Secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory.

In an embodiment, the architecture and/or functionality of the various previous figures are implemented in the context of the central processor 1202; parallel processing system 1212; an integrated circuit capable of at least a portion of the capabilities of both the central processor 1202; the parallel processing system 1212; a chipset (e.g., a group of integrated circuits designed to work and sold as a unit for performing related functions, etc.); and any suitable combination of integrated circuit.

In an embodiment, the architecture and/or functionality of the various previous figures is be implemented in the context of a general computer system, a circuit board system, a game console system dedicated for entertainment purposes, an application-specific system, and more. In an embodiment, the computer system 1200 may take the form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In an embodiment, a parallel processing system 1212 includes a plurality of PPUs 1214 and associated memories 1216. In an embodiment, the PPUs are connected to a host processor or other peripheral devices via an interconnect 1218 and a switch 1220 or multiplexer. In an embodiment, the parallel processing system 1212 distributes computational tasks across the PPUs 1214 which can be parallelizable—for example, as part of the distribution of computational tasks across multiple GPU thread blocks. In an embodiment, memory is shared and accessible (e.g., for read and/or write access) across some or all of the PPUs 1214, although such shared memory may incur performance penalties relative to the use of local memory and registers resident to a PPU. In an embodiment, the operation of the PPUs 1214 is synchronized through the use of a command such as_syncthreads( ) which requires all threads in a block (e.g., executed across multiple PPUs 1214) to reach a certain point of execution of code before proceeding.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C." unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context, in an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer system comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered a system.

In the present document, references may be made to obtaining, acquiring, receiving, or inputting analog or digital data into a subsystem, computer system, or computer-implemented machine. The process of obtaining, acquiring, receiving, or inputting analog and digital data can be accomplished in a variety of ways such as by receiving the data as a parameter of a function call or a call to an application programming interface. In some implementations, the process of obtaining, acquiring, receiving, or inputting analog or digital data can be accomplished by transferring the data via a serial or parallel interface. In another implementation, the process of obtaining, acquiring, receiving, or inputting analog or digital data can be accomplished by transferring the data via a computer network from the providing entity to the acquiring entity. References may also be made to providing, outputting, transmitting, sending, or presenting analog or digital data, in various examples, the process of providing, outputting, transmitting, sending, or presenting analog or digital data can be accomplished by transferring the data as an input or output parameter of a function call, a parameter of an application programming interface or interprocess communication mechanism.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:

generating a first frame from a first video and a second frame from a second video captured by cameras at different locations, the respective frames having overlapping fields of view;

slicing the overlapping fields of view of corresponding frames into a plurality of corresponding image slices of respective overlap regions of the corresponding frames;

determining a forward flow field from the first overlap region to the second overlap region and a reverse flow field from the second overlap region to the first overlap region and scale the forward and reverse flow fields of respective slices to generate an interpolated region;

and combining the interpolated overlap region with non-overlapping regions of the respective frames slices to form a panoramic frame.

2. The method of claim 1, and further comprising before the slicing:

transforming the overlapping fields of view of corresponding frames to have an origin; and transforming the overlapping fields of view of corresponding frames to be projected onto a common view cylinder.

3. The method of claim 1, wherein the interpolating the corresponding image slices to provide multiple points of view comprises:

interpolating corresponding image columns.

4. The method of claim 3, wherein an interpolation of corresponding image columns shall comprise multiple points of view such that a respective interpolated image slice of a plurality of image slices comprises a different point of view.

5. An apparatus, comprising:

one or more processors to:

generate a first frame from a first video and a second frame from a second video captured by cameras at different locations, the respective frames having overlapping fields of view;

slice the overlapping fields of view of corresponding frames into a plurality of corresponding image slices of respective overlap regions of the corresponding frames;

determine a forward flow field from the first overlap region to the second overlap region and a reverse flow field from the second overlap region to the first overlap region and scale the forward and reverse flow fields of respective slices to generate an interpolated region;

and combine the interpolated region with non-overlapping regions of the respective frames slices to form a panoramic frame.

6. The apparatus of claim 5, wherein the one or more processors are further to:

transform the overlapping fields of view of corresponding frames to have an origin; and transform the overlapping fields of view of corresponding frames to be projected onto a common view cylinder.

7. The apparatus of claim 5, wherein the interpolated region forms a single image to be included as part of the panoramic image.

8. The apparatus of claim 5, further comprising:

a vehicle comprising one or more cameras positioned at different locations on the vehicle;

wherein the corresponding frames images are to be acquired from the one or more cameras.

9. The apparatus of claim 5, further comprising one or more cameras, wherein: the one or more cameras include a first camera at a first location and a second camera at a second location, the first location different than the second location;

wherein the corresponding frames are to be acquired from the one or more cameras.

10. The apparatus of claim 9, wherein the interpolating the corresponding slices to provide multiple points of view is to comprise:

the interpolation of corresponding image columns so that a point of view is able to shift from a point of view of the first camera to a point of view of the second camera.

11. The apparatus of claim 10, wherein non-overlapping portions of the fields of view of the corresponding images are to be joined with the single image to produce a panoramic image.

12. The apparatus of claim 11, further comprising a video screen that is to display the panoramic image.

13. One or more processors, comprising:

circuitry to:

generate a first frame from a first video and a second frame from a second video captured by cameras at different locations, the respective frames having overlapping fields of view;

slice the overlapping fields of view of corresponding frames into a plurality of corresponding image slices of respective overlap regions of the corresponding frames;

determine a forward flow field from the first overlap region to the second overlap region and a reverse flow field from the second overlap region to the first overlap region and scale the forward and reverse flow fields of respective slices to generate an interpolated region;

and combine the interpolated region with non-overlapping regions of the respective frames slices to form a panoramic frame.

14. The one or more processors of claim 13, wherein the circuitry is further to: join non-overlapping fields of view of the corresponding images with the single image to generate a panoramic image.

15. The one or more processors of claim 14, wherein the circuitry is further to:

present the panoramic image on a display screen.

16. The one or more processors of claim 13, wherein:

interpolation of the corresponding slices is to comprise a pushbroom interpolation approach.

17. The one or more processors of claim 16, wherein:

the interpolated slices for the corresponding images are to comprise a linear blending technique.

18. The one or more processors of claim 13, wherein the one or more processors is further to:

transform the overlapping fields of view of corresponding images to have an origin; and transform the overlapping fields of view of corresponding images to be projected onto a common view cylinder.

19. The method of claim 1, and further generating a visibility map indicating features intended to be visible in the interpolated region and usable to mitigate ghosting artifacts due to occlusions in the interpolated region by using the visibility map as weights to blend the interpolated overlap region.

20. The apparatus of claim 5, wherein the one or more processors are further to generate a visibility map indicating features intended to be visible in the interpolated region and usable to mitigate ghosting artifacts due to occlusions in the interpolated region by using the visibility map as weights to blend the interpolated region.

21. The one or more processors of claim 13, wherein the circuitry is further to generate a visibility map indicating features intended to be visible in the interpolated region and usable to mitigate ghosting artifacts due to occlusions in the interpolated region by using the visibility map as weights to blend the interpolated region.

22. The method of claim 1, wherein the scaling comprises scaling the forward and reverse flow fields of respective slices by a slice-position-dependent factor to generate the interpolated region.

23. The apparatus of claim 5, wherein the one or more processors to scale the forward and reverse flow fields of respective slices comprise the one or more processors to scale by a slice-position-dependent factor to generate the interpolated region.

24. The one or more processors of claim 13, wherein the circuitry is further to scale the forward and reverse flow fields of respective slices comprises the circuitry to scale by a slice-position-dependent factor to generate the interpolated region.

* * * * *